United States Patent
Han et al.

(10) Patent No.: US 11,159,279 B2
(45) Date of Patent: Oct. 26, 2021

(54) ELECTRONIC DEVICE, AND METHOD FOR BLUETOOTH-BASED DATA TRANSMISSION IN ELECTRONIC DEVICE

(71) Applicant: Samsung Electronics Co., Ltd, Suwon-si (KR)

(72) Inventors: Eui-Bum Han, Seongnam-si (KR); Hyung-Seoung Yoo, Anyang-si (KR); Gu-Pil Cheong, Suwon-si (KR); Andrew Credland, Cambridgeshire (GB); Tae-Hun Lim, Gwacheon-si (KR); Gabriele Vitiello, Cambridgeshire (GB); Shivaji Ramachandra Patil, Cambridgeshire (GB); Henrik Ejersbo, Nibe (DK)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/616,357

(22) PCT Filed: Apr. 13, 2018

(86) PCT No.: PCT/KR2018/004332
§ 371 (c)(1),
(2) Date: Nov. 22, 2019

(87) PCT Pub. No.: WO2018/216904
PCT Pub. Date: Nov. 29, 2018

(65) Prior Publication Data
US 2020/0162205 A1    May 21, 2020

(30) Foreign Application Priority Data

May 23, 2017 (KR) .................. 10-2017-0063702

(51) Int. Cl.
*H04L 1/18* (2006.01)
*H04W 28/04* (2009.01)
(Continued)

(52) U.S. Cl.
CPC ........... *H04L 1/1825* (2013.01); *H04W 28/04* (2013.01); *H04W 52/48* (2013.01); *H04W 88/06* (2013.01)

(58) Field of Classification Search
CPC .... H04L 1/1825; H04W 28/04; H04W 52/48; H04W 88/06
See application file for complete search history.

(56) References Cited

U.S. PATENT DOCUMENTS 8,417,187 B2    4/2013    Chen et al.
8,577,291 B1    11/2013   Mak
(Continued)

FOREIGN PATENT DOCUMENTS

KR    10-2004-0026753 A    4/2004
KR    10-2004-0055553 A    6/2004
(Continued)

OTHER PUBLICATIONS

International Search Report dated Jul. 17, 2018 in connection with International Patent Application No. PCT/KR2018/004332, 2 pages.
(Continued)

*Primary Examiner* — Jael M Ulysse

(57) ABSTRACT

According to an embodiment of the present invention, an electronic device for Bluetooth-based data transmission may comprise: a housing; a first communication circuit which is located inside the housing and uses a first band; a second communication circuit which is located inside the housing and uses the first band; a processor electrically connected to the first communication circuit and the second communication circuit; and a memory located inside the housing and
(Continued)

electrically connected to the processor, wherein the memory stores instructions configured to, when executed, cause the processor to detect a communication state of at least one of the first communication circuit and the second communication circuit, and control retransmission of at least a part of data having been transmitted to an external electronic device via the first communication circuit, on the basis of the detected communication state. Various other embodiments are possible.

14 Claims, 12 Drawing Sheets

(51) Int. Cl.
*H04W 52/48* (2009.01)
*H04W 88/06* (2009.01)

(56) References Cited

U.S. PATENT DOCUMENTS

| | | | | |
|---|---|---|---|---|
| 2003/0139136 | A1* | 7/2003 | Pattabiraman | H04B 1/715 455/41.1 |
| 2004/0120341 | A1 | 6/2004 | Hur et al. | |
| 2006/0205401 | A1* | 9/2006 | Palin | H04M 1/6066 455/425 |
| 2006/0292986 | A1* | 12/2006 | Bitran | H04W 16/14 455/41.2 |
| 2008/0238629 | A1* | 10/2008 | Gonikberg | H04L 1/0015 340/10.4 |
| 2009/0003307 | A1* | 1/2009 | Yang | H04W 56/00 370/350 |
| 2009/0017756 | A1* | 1/2009 | Tsfaty | H04W 52/0238 455/41.2 |
| 2009/0054009 | A1* | 2/2009 | Yang | H04W 16/14 455/78 |
| 2010/0085987 | A1* | 4/2010 | Kamata | H04W 28/06 370/477 |
| 2010/0202416 | A1* | 8/2010 | Wilhelmsson | H04W 72/1215 370/336 |
| 2010/0265856 | A1* | 10/2010 | Yang | H04B 7/2656 370/281 |
| 2011/0026512 | A1* | 2/2011 | Wenham | H04W 72/1215 370/345 |
| 2011/0059768 | A1* | 3/2011 | Pandruvada | H04W 88/06 455/552.1 |
| 2012/0254682 | A1* | 10/2012 | Wan | H04L 1/1845 714/748 |
| 2012/0302184 | A1* | 11/2012 | Zaitsu | H04W 72/1215 455/78 |
| 2013/0301420 | A1* | 11/2013 | Zhang | H04W 4/90 370/241 |
| 2014/0269534 | A1* | 9/2014 | Persson | H04W 76/36 370/329 |
| 2015/0264626 | A1* | 9/2015 | Perdomo | H04L 5/00 370/216 |
| 2016/0219609 | A1* | 7/2016 | Patel | H04W 4/16 |
| 2017/0094677 | A1* | 3/2017 | Liu | H04W 72/0446 |

FOREIGN PATENT DOCUMENTS

| | | |
|---|---|---|
| KR | 10-2010-0103667 A | 9/2010 |
| KR | 10-1006394 B1 | 1/2011 |
| WO | 2008/153798 A2 | 12/2008 |

OTHER PUBLICATIONS

Written Opinion of the International Searching Authority dated Jul. 17, 2018 in connection with International Patent Application No. PCT/KR2018/004332, 5 pages.

* cited by examiner

ELECTRONIC DEVICE, AND METHOD FOR BLUETOOTH-BASED DATA TRANSMISSION IN ELECTRONIC DEVICE

CROSS-REFERENCE TO RELATED APPLICATIONS

This application is a 371 of International Application No. PCT/KR2018/004332 filed on Apr. 13, 2018, which claims priority under 35 U.S.C. § 119 to Korean Patent Application No. 10-2017-0063702 filed on May 23, 2017 in the Korean Intellectual Property Office, the disclosures of which are herein incorporated by reference in their entirety.

BACKGROUND

1. Field

Various embodiments of the disclosure relate to a method and apparatus for transmitting data in a wireless communication system based on Bluetooth.

2. Description of Related Art

Bluetooth is a communication protocol designed to enable system configuration with low power consumption and at low cost using a frequency in a 2.4 GHz or 5 GHz band that is an industrial, scientific, and medical (ISM) band.

Bluetooth supports audio streaming technologies and provides a function of transmitting audio packets for audio streaming to a counterpart device through a wireless link. Packet error/loss/delay may occur due to interference, etc., caused by various interfaces (e.g., Wireless Fidelity (Wi-Fi), ZigBee, physical barriers, etc.) sharing the same band as a Bluetooth band, degrading the quality of audio packets.

In transmission of the audio packets, to minimize a transmission loss such as packet error/loss/delay, the transmission loss has been solved by using retransmission or transmission power control in an existing Bluetooth special interest group (SIG).

SUMMARY

A Bluetooth technique has used a retransmission scheme based on a retransmission count (e.g., twice) defined in a SIG specification, but for data guaranteeing real-timeness such as voice data, a sound source loss is caused by a transmission loss in case of a transmission failure due to a fixed retransmission count, resulting in a sound cutoff phenomenon. In addition, audio packet retransmission continuously occupies a time slot, exerting a negative influence on an RF environment of other RF devices (e.g., Wi-Fi, Bluetooth low energy (BLE), ZigBee, etc.).

When the transmission failure is prevented using transmission power control, there may be an electronic device that does not support the transmission power control, and due to the use of the fixed transmission power for audio packet transmission, an instantly occurring transmission loss may not be avoided in a poor radio frequency (RF) environment.

Various embodiments of the disclosure provide a method and apparatus for transmitting Bluetooth-based data to maintain data quality, by dynamically determining or changing a configuration value related to retransmission of data based on various wireless interface environments or device environments that may affect a wireless link environment of Bluetooth.

According to various embodiments of the disclosure, an electronic device includes a housing, a first communication circuit which is located in the housing and uses a first band, a second communication circuit which is located in the housing and uses the first band, at least one processor which is located in the housing and electrically connected to the first communication circuit and the second communication circuit, and a memory which is located in the housing and electrically connected to the processor, in which the memory stores instructions that cause, when executed, the processor to detect a communication state of at least one of the first communication circuit or the second communication circuit and to control retransmission of at least a part of data transmitted to an external electronic device through the first communication circuit, based on the detected communication state.

According to various embodiments of the disclosure, a method for transmitting Bluetooth-based data in an electronic device includes detecting a communication state of at least one of a first communication circuit using a first band or a second communication circuit using the first band and controlling retransmission of at least a part of data transmitted to an external electronic device through the first communication circuit, based on the detected communication state.

According to various embodiments of the disclosure, a computer-readable recording medium has recorded thereon a program to be executed on a computer, the program including instructions that cause, when executed by a processor, the processor to detect a communication state of at least one of a first communication circuit using a first band or a second communication circuit using the first band and to control retransmission of at least a part of data transmitted to an external electronic device through the first communication circuit, based on the detected communication state.

According to various embodiments of the disclosure, an electronic device may dynamically determine or change a packet data configuration value related to audio packet retransmission based on various wireless interface environments or device environments that may affect a wireless link environment of Bluetooth.

DETAILED DESCRIPTION

Figure 1:
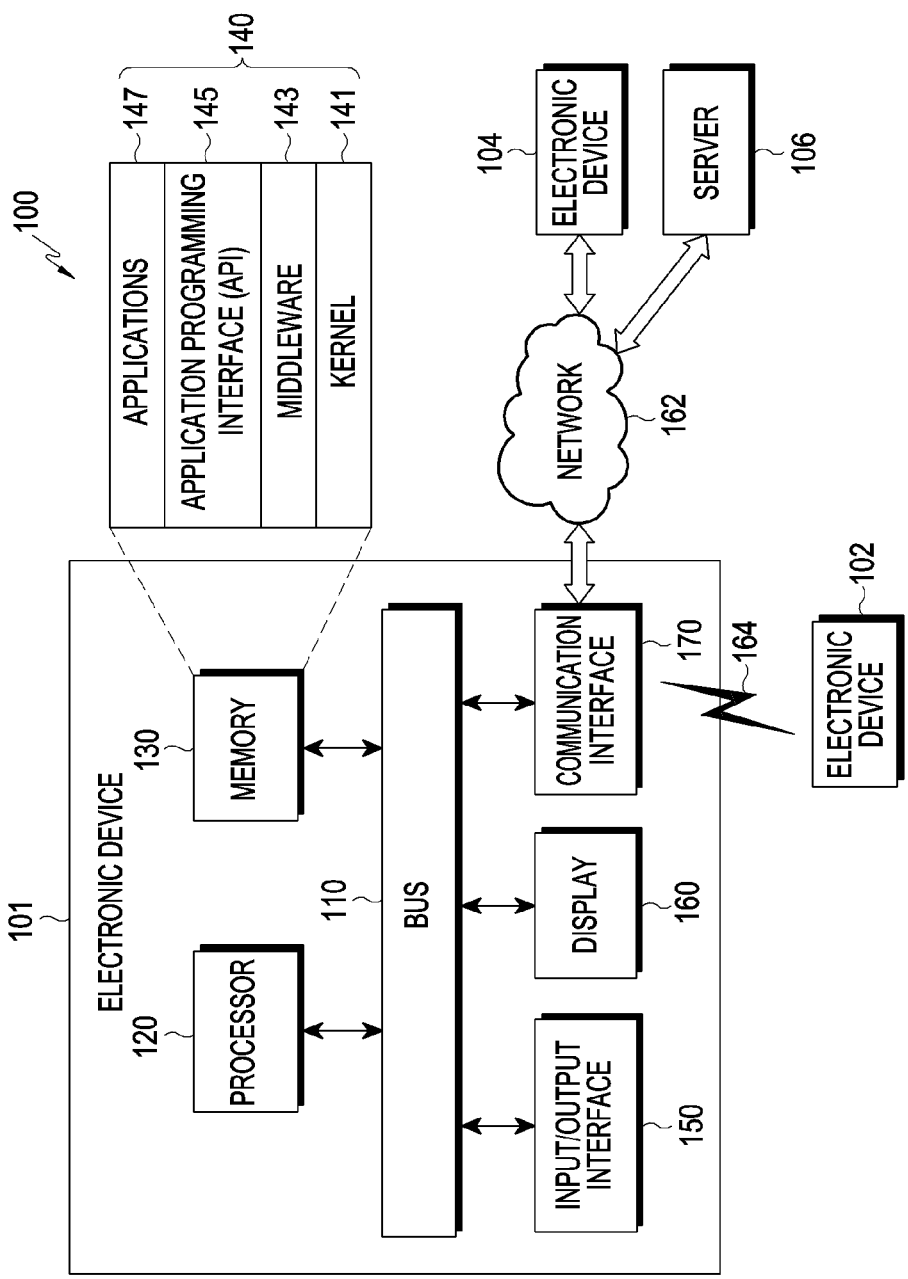
FIG. 1 is a block diagram of an electronic device in a network environment according to various embodiments of the disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A or/and B," or "one or more of A or B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situations, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, mobile medical equipment, a camera, or a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implantable circuit, or the like. In some embodiments, the electronic device may include, for example, at least one of a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a media box (e.g., Samsung HomeSync™, Apple TV™, or Google TV™), a game console (e.g., Xbox™, PlayStation™, etc.), an electronic dictionary, an electronic key, a camcorder, or an electronic frame.

In other embodiments, the electronic device may include at least one of various medical equipment (e.g., various portable medical measurement devices (a blood glucose meter, a heart rate measuring device, a blood pressure measuring device, a body temperature measuring device, etc.), magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sale (POS), and an Internet of things device (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of furniture, a building/structure, or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device (e.g., an artificial intelligence electronic device).

FIG. 1 is a block diagram of an electronic device in a network environment according to various embodiments of the disclosure.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message or data) between the elements 110 to 170.

The processor 120 may include one or more of a central processing unit (CPU), an application processor (AP), and a communication processor (CP). The processor 120 may perform operations or data processing for control or communication of, for example, at least one of the other elements of the electronic device 101.

The memory 130 may include a volatile or nonvolatile memory. The memory 130 may store, for example, instructions or data associated with at least one other elements of the electronic device 101. According to an embodiment, the memory 130 may store software or a program 140. The program 140 may include at least one of, for example, a kernel 141, middleware 143, an application programming interface (API) 145, or an application program (or "application") 147, and the like. At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen and receive a touch, a gesture, proximity, or a hovering input, for example, by using an electronic pen or a part of a body of a user. The communication interface 170 establishes communication between the electronic device 101 and an external device (e.g., the vehicle device 102, the electronic device 104, or the server 106). For example, the communication interface 170 may be connected to a network 162 through a wireless communication or wired communication to communicate with an external device (e.g., the second external electronic device 104 or the server 106).

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (Wi-Fi), Bluetooth, Bluetooth Low Energy (BLE), Zigbee, near field communication (NFC), magnetic secure transmission (MST), radio frequency (RF), and a body area network (BAN), as illustrated as an element 164 in FIG. 1. According to an embodiment, the wireless communication may include a global navigation satellite system (GNSS). The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), Recommended Standard 232 (RS-232), power line communication, a plain old telephone service (POTS), or the like. The network 162 may include a telecommunications network, for example, at least one of a computer network (e.g., a local area network (LAN) or a wide area network (WAN)), the Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102,104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

According to an embodiment of the disclosure, an electronic device 101 generates packet data having a compressed L2CAP header structure for transmission of audio packet data and transmits the generated packet data to an external electronic device 102 or 104. In Bluetooth, electronic devices may establish a link in a master-slave manner using a piconet scheme for communication. In the piconet scheme, one electronic device 101 (e.g., a master device) may configure a wireless network with multiple external electronic devices 102 or 104 (e.g., slave devices) to transmit and receive packet data therebetween.

Figure 2:
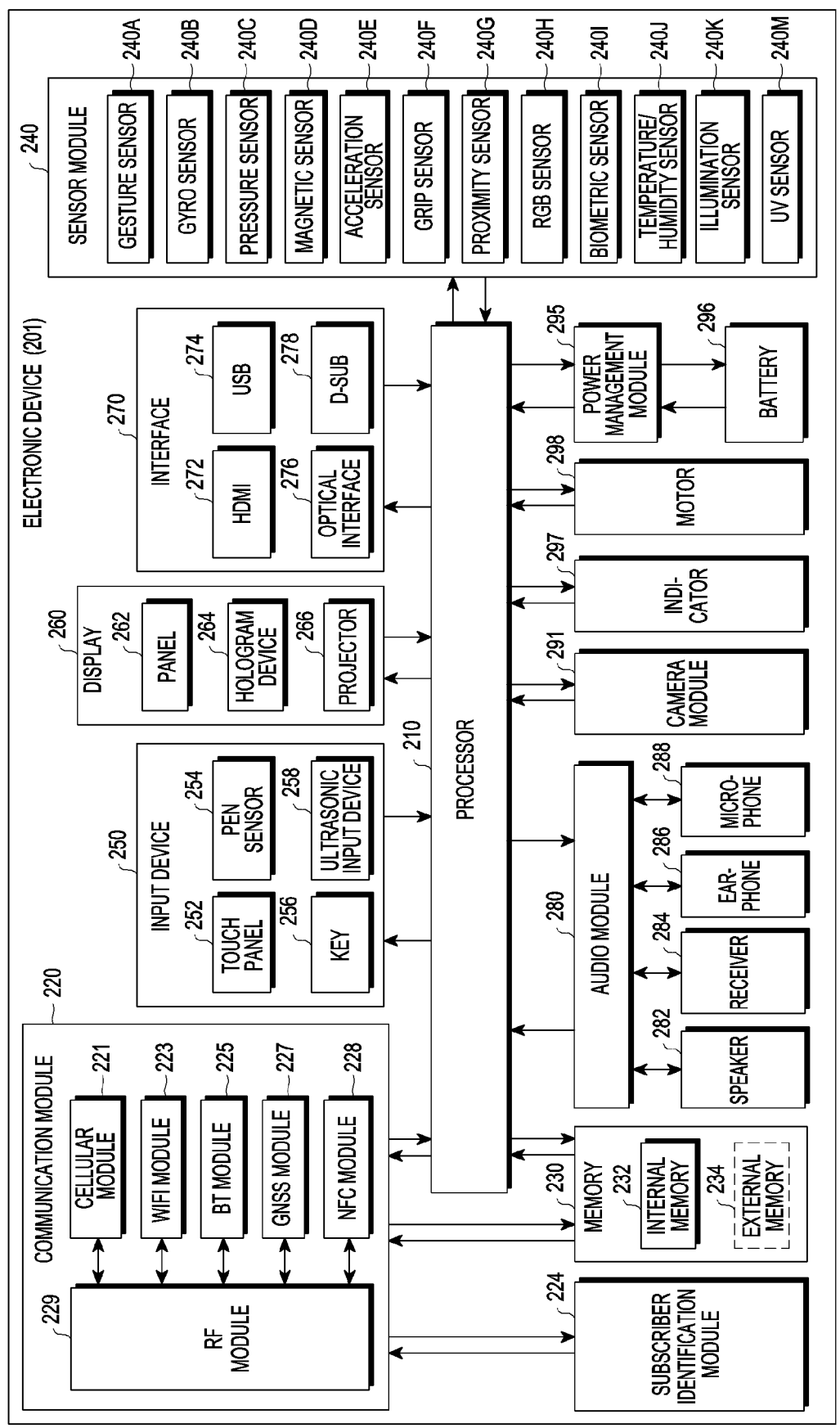
FIG. 2 is a block diagram of an electronic device according to various embodiments of the disclosure.

FIG. 2 is a block diagram of an electronic device 201 according to various embodiments of the present disclosure. The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an operating system (OS) or an application program, and performs processing and operations with respect to various data. The processor 210 may be implemented with, for example, a system on chip (SoC). According to an embodiment of the present disclosure, the server 210 may include a graphic processing unit (GPU) or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a Wi-Fi module 223, a Bluetooth (BT) module 225, a GNSS module 227, an NFC module 228, and a radio frequency (RF) module 229. The cellular module 221 may provide, for example, a voice call, a video call, a text service, or an Internet service over a communication network. According to an embodiment of the present disclosure, the cellular module 221 may identify and authenticate the electronic device 201 in a communication network by using the SIM 224 (e.g., a SIM card). According to an embodiment of the present disclosure, the cellular module 221 may perform at least one of functions that may be provided by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the BT module 225, the GNSS module 227, or the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment of the present disclosure, at least one of the cellular module 221, the Wi-Fi module 223, the BT module 225, the GNSS module 227, or the NFC module 228 may transmit and receive an RF signal through the separate RF module. The SIM 224 may, for example, include a card including a SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, or a fingerprint sensor. The sensor module 240 may further include a control circuit for controlling at least one sensor included therein. In some embodiment of the disclosure, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, or a control circuit for controlling them. The panel 262 may be implemented to be flexible, transparent, or wearable. The panel 262 may be configured with the touch panel 252 in one module. According to an embodiment of the present disclosure, the panel 262 may include a pressure sensor (or a "force sensor") capable of measuring a strength of a pressure by a user's touch. The pressure sensor may be implemented integrally with the touch panel 252 or may be implemented as one or more sensors separate from the touch panel 252. The hologram device 264 may show a stereoscopic image in the air by using interference of light. The projector 266 may display an image onto a screen through projection of light. The screen may be positioned inside or outside the electronic device 201. According to an embodiment, the interface 270 may include a high-definition multimedia interface (HDMI) 272, a universal serial bus (USB) 274, an optical interface 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio module 280 may bi-directionally convert sound and an electric signal. At least one element of the audio module 280 may be included in the input/output interface 150 illustrated in FIG. 1. The audio module 280 may process sound information input or output through the speaker 282, the receiver 284, the earphone 286, or the microphone 288. The camera module 291 may be, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 may manage power of the electronic device 201. According to an embodiment of the present disclosure, the power management module 295 may include a power management integrated circuit (PMIC), a charger IC, or a battery fuel gauge. The PMIC may have a wired or wireless charging scheme. The wireless charging scheme may further include a magnetic-resonance type, a magnetic induction type, and an electromagnetic type, and may further include an additional circuit for wireless charging, for example, a coil loop, a resonance circuit, a rectifier, etc. The battery gauge may measure the remaining capacity of the battery 296 or the voltage, current, or temperature of the battery 296 during charging. The battery 296 may include, for example, a rechargeable battery or a solar battery.

The indicator 297 displays a particular state, for example, a booting state, a message state, or a charging state, of the electronic device 201 or a part thereof (e.g., the processor 210). The motor 298 may convert an electric signal into mechanical vibration or generate vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments of the present disclosure, some components of the electronic device (e.g., the electronic device 201) may be omitted or may further include other elements, and some of the components may be coupled to form one entity and identically perform functions of the components before being coupled.

Figure 3:
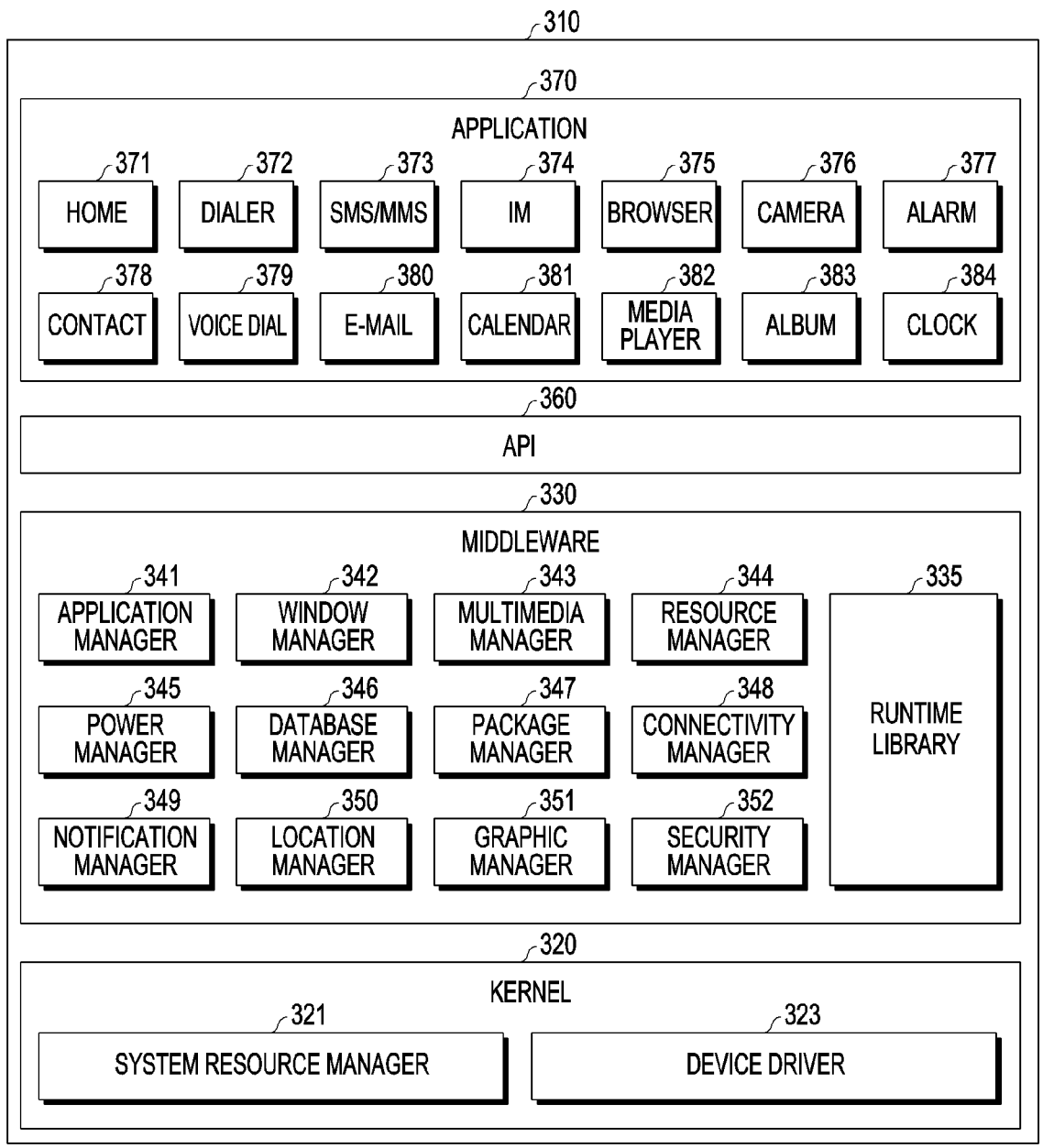
FIG. 3 is a block diagram of a programming module according to various embodiments of the disclosure.

FIG. 3 is a block diagram of a programming module according to various embodiments of the present disclosure. According to an embodiment of the present disclosure, a programming module 310 (e.g., the program 140) may include an OS for controlling resources associated with an electronic device (e.g., the electronic device 101) or various applications (e.g., the application program 147) executed on the OS. The OS may include Android™, iOS™, Windows™, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), or an application 370 (e.g., the application program 147). At least a part of the programming module 310 may be preloaded on an electronic device or may be downloaded from an external device (e.g., the electronic device 102 or 104, or the server 106).

The kernel 320 may include a system resource manager 321 or a device driver 323. The system resource manager 321 may perform control, allocation, retrieval of system resources, and so forth. According to an embodiment of the present disclosure, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 may manage a life cycle of the applications 370. The window manager 342 may manage a graphic user interface (GUI) resource used in a screen. The multimedia manager 343 may recognize a format necessary for playing media files and perform encoding or decoding on a media file by using a codec appropriate for a corresponding format. The resource manager 344 may manage a source code or a memory space of the applications 370. The power manager 345 may manage, for example, a capacity, a temperature, or power of a battery and determine or provide power information necessary for an operation of the electronic device using corresponding information. According to an embodiment, the power manager 345 may operate with basic input/output system (BIOS). The database manager 346 may generate, search or change a database used for at least one application among the applications 370. The package manager 347 may manage the installation or update of an application distributed in a package file format.

The connectivity manager 348 may manage a wireless connection. The notification manager 349 may provide an event, e.g., an arriving message, an appointment, proximity notification, etc. The location manager 350 may manage location information about an electronic device. The graphic manager 351 may manage, for example, a graphic effect to be provided to a user or a user interface relating thereto. The security manager 352 may provide, for example, system security or user authentication. According to an embodiment of the present disclosure, the middleware 330 may further include a telephony manager for managing a voice or video call function of the electronic device or a middleware module forming a combination of functions of the above-described components. According to an embodiment of the present disclosure, the middleware 330 may provide a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape), optical media (e.g., compact disc read only memory (CD-ROM) or digital versatile disc (DVD)), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

Figure 4:
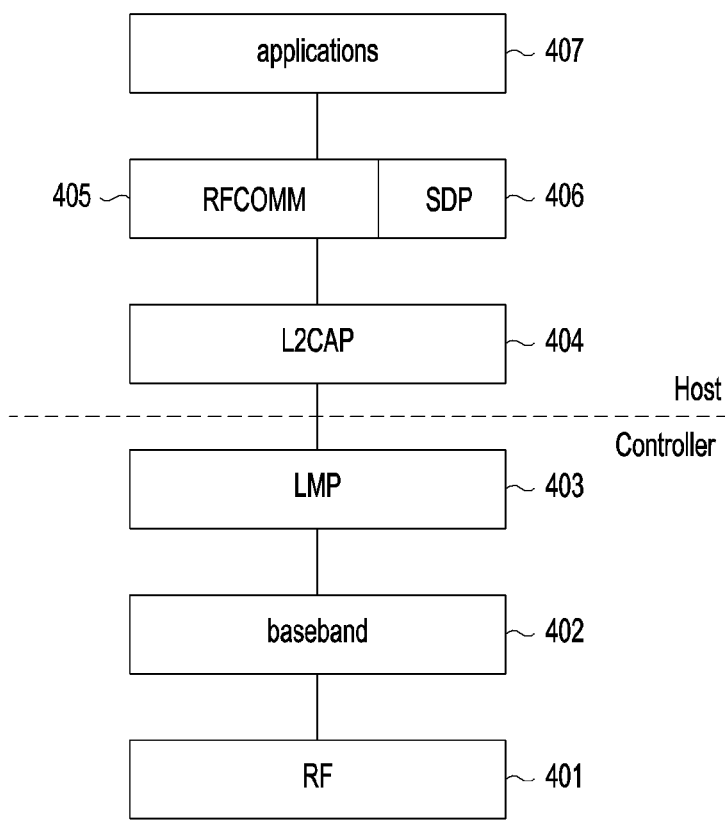
FIG. 4 is a view for describing a protocol stack of Bluetooth according to various embodiments of the disclosure.

FIG. 4 is a view for describing a protocol stack of Bluetooth according to various embodiments of the disclosure. Although a description of a protocol stack is included in the electronic device 101 (e.g., a master device) with reference to FIG. 4, a protocol stack included in the external electronic device 102 or 104 (e.g., a slave device) may also be entirely or at least partially identical to the protocol stack illustrated in FIG. 4.

Referring to FIG. 4, a protocol stack of Bluetooth may be roughly divided into a host part and a controller part. The host part may be referred to as a higher layer, and the controller part may be referred to as a lower layer. The host part and the controller part may exchange data through a host controller interface (HCI, not shown).

An RF 401 may actually control a radio transceiver, and more specifically, perform frequency hopping over 79 channels 1600 times per second with a bandwidth of 1 MHz in an ISM band of 2.4 GHz-2.4835 GHz, modulate data using a Gaussian frequency shift keying (G-FSK) modulation scheme, and control packet data and audio data, which are modulated into digital forms, to be transmitted and received using a time division duplex (TDD) scheme for duplex communication.

A baseband 402, which is a connection management protocol of a physical layer, may be in charge of error recovery, logical channel management, frequency hopping algorithm, security, and so forth. There may be connection types of the physical layer: a synchronous connection oriented (SCO) link having no reliability and an asynchronous connectionless (ACL) link guaranteeing reliability. A criterion of a link based on reliability may depend on data retransmission. A maximum of seven devices may be connected through one piconet, and one of the seven devices may be a master for performing piconet management, such as frequency hopping pattern generation, and so forth, and the other devices are slaves. Circuit and packet switching may be supported, and each packet may be transmitted at a different hopping frequency. Packet transmission is generally performed in one slot, but in some cases, may use three or five slots. Three voice channels may be synchronously transmitted at 64 kbps, and data may be asynchronously transmitted at 723 kbps or 57.6 kbps or synchronously transmitted at 432.6 kbps.

A link manager protocol (LMP) 403, which is a protocol that manages link establishment between Bluetooth devices, may provide a link control service such as automatic repeated request (ARQ) for requesting retransmission in case of reception of a baseband packet having an error or forward error correction (FEC) for tracking and modifying the number of bit errors of data.

A logical link control and adaptation protocol (L2CAP) 404 may not support identifiers for identifying higher layers or levels, such that the L2CAP 504 may perform multiplexing to identify a higher layer such as a serial cable emulation protocol (RFCOMM), a service discovery protocol (SDP), etc., and segment a packet having a large size used in a higher layer into a size available in a baseband layer or reassemble packets used in multiple baseband layers into a size of a packet used in a higher layer. The L2CAP 404 may be a protocol for implementing a quality of service (QoS) of data.

In an RFCOMM/SDP 406, RFCOMM may be a protocol for emulating an RS-232 9-pin serial port based on TS 07.10 of the European Telecommunications Standards Institute (ETSI), and an SDP 406 may be a protocol for exchanging information about a service available in a connected Bluetooth device and characteristics of the available service.

Applications 407 may control Bluetooth applications. A Bluetooth application may refer to an application to which a Bluetooth technique established in the Special Interest Group (SIG) is applied.

Figure 5:
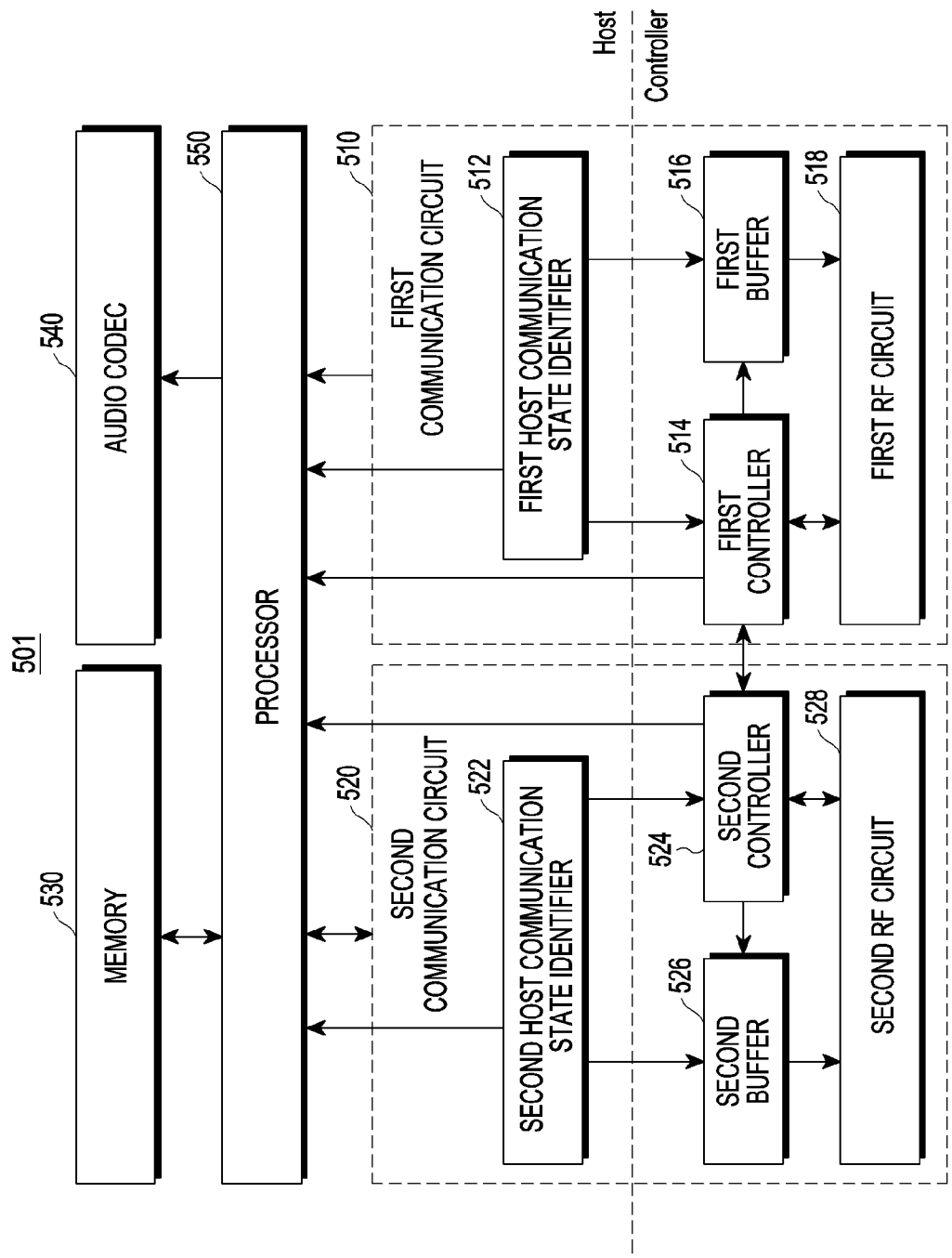
FIG. 5 is a block diagram of an electronic device that transmits Bluetooth-based data, according to various embodiments of the present disclosure.

FIG. 5 is a block diagram of an electronic device that transmits Bluetooth-based data, according to various embodiments of the present disclosure. The electronic device 501 of FIG. 5 may include the entire electronic device 101 illustrated in FIG. 1 or the electronic device 201 illustrated in FIG. 2, or a part of the electronic device 101 or 201.

Referring to FIG. 5, the electronic device 501 may include at least one of a first communication circuit 510, a second communication circuit 520, a memory 530, an audio codec 540, or a processor 550. The electronic device 501 may be divided into a host part and a controller part. The host part may include at least one of a first host communication state identifier (or identifying unit) 512 of the first communication circuit 520, a second host communication state identifier (or identifying unit) 522 of the second communication circuit 520, the memory 530, the audio codec 540, or the processor 550. The controller part may include at least one of a first controller 514, a first buffer 516, and a first RF circuit 518 of the first communication circuit 510 or a second controller 524, a second buffer 526, and a second RF circuit 528 of the second communication circuit 520. The host part and the controller part may exchange data through an HCI.

According to various embodiments of the disclosure, the first communication circuit 510 may set wireless communication using a first band between the electronic device 501 and an external electronic device (e.g., the external electronic device 102 or 104 or the server 106), and may be divided into a host part and a controller part. The first communication circuit 510 may provide first information associated with a first service being executed to the processor 550 through the first communication circuit 510 (e.g., the first RF circuit 518) or may identify a first communication state of the first communication circuit 510 based on the first information. According to an embodiment of the disclosure, the first band may be an ISM 2.4 GHz band or 5 GHz band. According to an embodiment of the disclosure, the first information may include first service information corresponding to the first service. According to an embodiment of the disclosure, the first service information may be information associated with the first service executed by the controller part or the host part of the first communication circuit 510, e.g., at least some of scanning information, connection information, voice call state information, streaming information, or file transmission state information.

According to an embodiment of the disclosure, the host part of the first communication circuit 510 may include the first host communication state identifier 512 capable of detecting the first service information corresponding to the first service being executed in the host part of the first communication circuit 510. According to an embodiment of the disclosure, the first host communication state identifier 512 may detect the first service information corresponding to the first service being executed in the host part through at least one of a generic access profile (GAP), a hands free profile (HFP), an advanced audio distribution profile (A2DP), a human interface profile (HID), or an object push profile (OPP). For example, the first host communication state identifier 512 may detect the scanning information or the connection information from the GAP through the first communication circuit 510. The first host communication state identifier 512 may detect the voice call state information from the HFP through the first communication circuit 510. The first host communication state identifier 512 may detect the streaming state information from the A2DP through the first communication circuit 510. The first host communication state identifier 512 may detect keyboard or mouse connection state information of the electronic device 501 from the HID. The first host communication state identifier 512 may detect the file transmission state information from the OPP through the first communication circuit 510.

According to an embodiment of the disclosure, the first host communication state identifier 512 may provide the first service information detected from at least one of the GAP, the HFP, the A2DP, the HID, or the OPP to the processor 550 or the first controller 514.

According to an embodiment of the disclosure, the controller part of the first communication circuit 510 may include at least one of the first controller 514, the first buffer 516, or the first RF circuit 518. According to an embodiment of the disclosure, the first controller 514 may overall control the first communication circuit 510 using the first band. According to an embodiment of the disclosure, the first controller 514 may detect the first service information corresponding to the first service being executed in the controller part of the first communication circuit 510. The first controller 514 may identify the first communication state of the first communication circuit 510 based on the first service information detected in the host part or the controller part. According to an embodiment of the disclosure, the first controller 514 may detect the first service information corresponding to the first service being executed in the controller part through at least one of a link manager protocol (LMP) or a link controller (LC). For example, the first controller 514 may detect the scanning information or the connection information from the LMP through the first communication circuit 510. The first controller 514 may detect the voice call state information from the LC through the first communication circuit 510.

According to an embodiment of the disclosure, the first controller 514 may provide the first service information detected from the LMP or the LC to the processor 550. According to an embodiment of the disclosure, the first controller 514 may identify the first communication state of the first communication circuit 510 as one of an off state, an idle state, a normal state, or an urgent state, based on the first service information detected in the host part or the controller part. For example, the first controller 514 may identify the first communication state of the first communication circuit 510 as the urgent state, when the detected first service information includes one of the scanning information, the connection information, the voice call state information, and the streaming state information. The first controller 514 may identify the first communication state of the first communication circuit 510 as the normal state, when the detected first service information includes the file transmission state information. The first controller 514 may identify the first communication state of the first communication circuit 510 as the idle state, when the first communication circuit 510 is activated, but the first service information is not detected.

The first controller 514 may identify the first communication state of the first communication circuit 510 as the off state, when the first communication circuit 510 is deactivated. According to an embodiment of the disclosure, a QoS level may be raised or an operation priority of the first service may be raised, in order of the off state, the idle state, the normal state, and the urgent state.

According to an embodiment of the disclosure, the first controller 514 may provide the identified first communication state to the processor 550 or the second controller 524. According to an embodiment of the disclosure, the first information may further include at least some of first resource information, first traffic information, first data loss information required for executing the first service or first buffer state information of the first buffer 516 in addition to the first service information corresponding to the first service being executed through the first RF circuit 518.

According to an embodiment of the disclosure, the first resource information may include all resources (e.g., consumed current, consumed power, etc.) required for providing the first service being executed. The first traffic information may include a transmission rate, a transmission error rate, a delay time, etc., of the first communication circuit 510. The first data loss information may include a packet error rate (PER) or a bit error rate (BER) of data corresponding to the first service. The first buffer state information may include state information of the first buffer 516 in which the data corresponding to the first service temporarily waits, and for example, the first controller 514 or the processor 550 may detect the first buffer state information based on the number of queues temporarily waiting in the first buffer 516 of the first communication circuit 510.

According to various embodiments of the disclosure, when the first buffer 516 transmits the data corresponding to the first service being executed to an external electronic device 102 or 104 through the first RF circuit 518, the first buffer 516 may perform buffering that causes at least a part (e.g., a packet) of the data to temporarily wait. The first controller 514 may detect a state of the first buffer 516 in which the at least a part of the data corresponding to the first service temporarily waits. For example, the first controller 514 may detect the state of the first buffer 516 based on the number of queues temporarily waiting in the first buffer 516 of the first communication circuit 510. The first controller 514 may provide the detected state of the first buffer 516 to the processor 550 or the second controller 524.

According to various embodiments of the disclosure, the first RF circuit 518 may perform a wireless communication function of the electronic device 501. The first RF circuit 518 may transmit or receive (at least a part of) Bluetooth-based data to or from an external electronic device. The first RF circuit 518 may collect information about a channel in which at least a part (e.g., a packet) of the data is transmitted, and provide the collected information to the first controller 514. According to an embodiment of the disclosure, the first controller 514 may identify the first communication state of the first communication circuit 510 based on the collected information. The first controller 514 may provide the identified first communication state of the first communication circuit 510 to the processor 550.

According to various embodiments of the disclosure, the second communication circuit 520 may set wireless communication using the first band (e.g., the ISM 2.4 GHz or 5 GHz band) between the electronic device 501 and an external electronic device (e.g., the external electronic device 102 or 104 or the server 106) and may be divided into a host part and a controller part. The second communication circuit 520 may provide second information associated with a second service being executed to the processor 550 through the second communication circuit 520 (e.g., the second RF circuit 528) or may identify a second communication state of the second communication circuit 520 based on the second information. According to an embodiment of the disclosure, the second information may include second service information corresponding to the second service. According to an embodiment of the disclosure, the second service information may be information associated with the second service executed by the controller part or the host part of the second communication circuit 520, e.g., at least some of scanning information, connection information, voice call state information, streaming information, or file transmission state information.

According to an embodiment of the disclosure, the host part of the second communication circuit 520 may include the second host communication state identifier 522 capable of detecting the second service information corresponding to the second service being executed in the host part of the second communication circuit 520. According to an embodiment of the disclosure, the second host communication state identifier 522 may detect the second service information corresponding to the second service being executed in the host part through at least one of a Wi-Fi protected access (WPA) supplicant, a voice over Internet protocol (VoIP) service, or a Wi-Fi traffic monitor. For example, the second host communication state identifier 522 may detect the scanning information or the connection information from the WPA supplicant through the second communication circuit 520. The second host communication state identifier 522 may detect the voice call state information from the VoIP service through the second communication circuit 520. The second host communication state identifier 522 may detect a Wi-Fi transmission or reception packet transmission amount from the Wi-Fi traffic monitor through the second communication circuit 520.

According to an embodiment of the disclosure, the second host communication state identifier 522 may provide the second service information detected from at least one of the WPA supplicant, the VoIP service, or the Wi-Fi traffic monitor to the processor 550 or the second controller 524.

According to an embodiment of the disclosure, the controller part of the second communication circuit 520 may include at least one of the second controller 524, the second buffer 526, or the second RF circuit 528. According to an embodiment of the disclosure, the second controller 524 may overall control the second communication circuit 520 using the first band. According to an embodiment of the disclosure, the second controller 524 may detect the second service information corresponding to the second service being executed in the controller part of the second communication circuit 520. The second controller 524 may identify the second communication state of the second communication circuit 520 based on the second service information detected in the host part or the controller part. The second controller 524 may provide the identified second communication state to the processor 550. According to an embodiment of the disclosure, the second controller 524 may detect the second service information corresponding to the second service being executed in the controller part through media access control (MAC) or Wi-Fi multimedia (WMM) QoS. For example, the second controller 524 may detect the scanning information or the connection information from the MAC through the second communication circuit 520. The first controller 524 may detect the voice call state information, the data transmission state information, the data, or video streaming information from the WMM QoS through the second communication circuit 520.

According to an embodiment of the disclosure, the second controller 524 may provide the second service information detected from the MAC or the WMM to the processor 550. According to an embodiment of the disclosure, the second controller 524 may identify the second communication state of the second communication circuit 520 as one of the off state, the idle state, the normal state, or the urgent state, based on the second service information detected in the host part or the controller part. For example, the second controller 524 may identify the second communication state of the second communication circuit 520 as the urgent state, when the detected second service information includes one of the scanning information, the connection information, the voice call state information, or data or video streaming information. The second controller 524 may identify the second communication state of the second communication circuit 520 as the normal state, when the detected second service information includes the data transmission state information. The second controller 524 may identify the second communication state of the second communication circuit 520 as the idle state, when the second communication circuit 520 is activated, but the second service information is not detected. The second controller 524 may identify the second communication state of the second communication circuit 520 as the off state, when the second communication circuit 520 is deactivated. According to an embodiment of the disclosure, a QoS level may be raised or an operation priority of the second service may be raised, in order of the off state, the idle state, the normal state, and the urgent state.

According to an embodiment of the disclosure, the second information may further include at least some of second resource information, second traffic information, second data loss information required for executing the second service or second buffer state information of the second buffer 526 in addition to the second service information corresponding to the second service being executed through the second RF circuit 528.

According to an embodiment of the disclosure, the second resource information may include all resources (e.g., consumed current, consumed power, etc.) required for providing the second service being executed. The second traffic information may include a transmission rate, a transmission error rate, a delay time, etc., of the second communication circuit 520. The first data loss information may include a PER or a BER of data corresponding to the first service. The second buffer state information may include state information of the second buffer 526 in which the data corresponding to the second service temporarily waits, and for example, the second controller 524 or the processor 550 may detect the second buffer state information based on the number of queues temporarily waiting in the second buffer 526 of the second communication circuit 520.

According to various embodiments of the disclosure, when the second buffer 526 transmits the data corresponding to the second service being executed to the external electronic device 102 or 104 through the second RF circuit 528, the second buffer 526 may perform buffering that causes at least a part (e.g., a packet) of the data to temporarily wait. The second controller 524 may detect a state of the second buffer 526 in which the at least a part of the data corresponding to the first service temporarily waits. For example, the second controller 524 may detect the state of the second buffer 526 based on the number of queues temporarily waiting in the second buffer 526 of the second communication circuit 520. The second controller 524 may provide the detected state of the second buffer 526 to the processor 550 or the first controller 514.

According to various embodiments of the disclosure, the second RF circuit 528 may perform a wireless communication function of the electronic device 501. The second RF circuit 528 may transmit or receive (at least a part of) Bluetooth-based data to or from an external electronic device. In another example, the second RF circuit 528 may perform wired/wireless communication in various forms such as ZigBee or BLE using the same first band as Bluetooth, as well as Wi-Fi-based communication. According to various embodiments of the disclosure, the second RF circuit 528 may collect information about a channel in which at least a part (e.g., a packet) of the data is transmitted and provide the collected information to the second controller 524. According to an embodiment of the disclosure, the second controller 524 may detect the second communication state of the second communication circuit 520 based on the collected information. The second controller 524 may provide the identified second communication state of the second communication circuit 520 to the processor 550 or the first controller 514.

According to an embodiment of the disclosure, the first controller 514 of the first communication circuit 510 and the second controller 524 of the second communication circuit 520 may provide their collected information to each other. For example, the first controller 514 may be provided from the second controller 524 with the second information including the second service information collected from the host part or the controller part of the second communication circuit 520. The second controller 524 may be provided from the second controller 524 with the first information including the first service information collected from the host part or the controller part of the first communication circuit 510.

According to an embodiment of the disclosure, the first controller 514 may control retransmission of at least a part of data transmitted to the external electronic device 102 or 104 through the first communication circuit 510 based on at least one communication state of the first communication circuit 510 or the second communication circuit 520. For example, the first controller 514 may perform an operation of the processor 550 described below.

According to an embodiment of the disclosure, the second controller 524 may control retransmission of at least a part of data transmitted to the external electronic device 102 or 104 through the first communication circuit 510 based on a communication state of at least one of the first communication circuit 510 or the second communication circuit 520. For example, the second controller 524 may perform an operation of the processor 550 described below.

In FIG. 5, the first controller 514 and the second controller 524 are illustrated as being included in corresponding communication circuits, respectively, but they may also be integrated into one without being limited thereto.

According to an embodiment of the disclosure, the first communication circuit 510 and the second communication circuit 520 may be integrated into one. For example, the first communication circuit 510 and the second communication circuit 520 may be integrated into one chip.

According to an embodiment of the disclosure, the data may be audio data, a type of which may include SCO, enhanced SCO (eSCO), or ACL. According to an embodiment of the disclosure, the SCO or eSCO data may include voice data (e.g., voice during a voice call), and the ACL data may include data (e.g., audio streaming data such as a sound source, etc.,) other than voice data.

According to various embodiments of the disclosure, the memory 530 may include a volatile or nonvolatile memory. The memory 530 may store, for example, instructions or data associated with at least one other elements of the electronic device 501. According to an embodiment of the disclosure, the memory 330 may store software or a program.

According to an embodiment of the disclosure, the memory 530 may store the first communication state of the first communication circuit 510 provided from the first communication circuit 510, collected information for a channel of the first communication circuit 510, or the first information related to the first service being executed through the first communication circuit 510.

According to an embodiment of the disclosure, the memory 530 may store the second communication state of the second communication circuit 520 provided from the second communication circuit 520, collected information for a channel of the second communication circuit 520, or the second information related to the second service being executed through the second communication circuit 520.

According to an embodiment of the disclosure, the memory 530 may store a retransmission count, a transmission power level, a packet type, or a retransmission time period which is designated in relation to at least partial retransmission of the data based on at least one of the first communication state or the second communication state.

According to an embodiment of the disclosure, the audio codec 540 may convert a pulse code modulation (PCM) signal of audio data into a digital audio signal, and compress the digital audio signal to a predefined frame size. The audio codec 540 may be included in the processor 550. According to an embodiment of the disclosure, the audio codec 540 may compress, e.g., 64 kbps or 32 kbps or less. According to an embodiment of the disclosure, as a compression rate decreases, a transmission error rate may decrease.

According to an embodiment of the disclosure, the processor 550 may perform overall control over an operation of communicating Bluetooth-based data. The processor 550 may control an operation of setting Bluetooth connection between the electronic device 501 and the external electronic device 102 or 104.

According to an embodiment of the disclosure, the processor 550 may include L2CAP (e.g., L2CAP 404) supporting higher-level protocol multiplexing, packet segmentation and reassembly, and conveying of QoS information. The L2CAP 404 causes a higher-level protocol and an application to transmit a higher-level data packet, i.e., an L2CAP service data unit (SDU), and performs channel flow-specific control through control over a flow and a retransmission mode. The L2CAP 404 provides physical channels referred to as L2CAP channels, each of which operates in a basic L2CAP mode, a flow control mode, and a retransmission mode. According to various embodiments of the disclosure, the L2CAP 404 may control a data flow with respect to audio data output from the audio codec 540 for asynchronous communication with an external electronic device 102 or 104 through buffering.

According to an embodiment of the disclosure, the processor 550 may detect a communication state of at least one of the first communication circuit 510 using the first band or the second communication circuit 520 using the first band. For example, the processor 550 may detect a communication state of each communication circuit based on a service being executed through the communication circuit.

According to an embodiment of the disclosure, the processor 550 may detect the first communication state of the first communication circuit based on the first information associated with the first service being executed through the first communication circuit 510.

According to an embodiment of the disclosure, the processor 550 may identify the first communication state as one of the off state, the idle state, the normal state, or the urgent state, based on the first information. A criterion for identifying the off state, the idle state, the normal state, or the urgent state may be as shown in Table 1.

TABLE 1

| Status | Definition |
| --- | --- |
| Off (NA) | Off |
| Idle (QoS Level 1) | idle operation (no operation with consection status) |
| Normal (QoS Level 2) | normal operation (rev data) |
| Urgent(QoS Level 3) | urgent operation (scanning, connecting, voice call or streaming data) |

Referring to Table 1, the processor 550 may identify the first communication state of the first communication circuit 510 as the off state (e.g., Not Available (NA)), when the first communication circuit 510 is deactivated. The processor 550 may identify the first communication state of the first communication circuit 510 as the idle state, when the first communication circuit 510 is activated, but there is no first service being executed through the first communication circuit 510 (for example, the first service information is not detected from the controller part or the host part of the first communication circuit 510). The processor 550 may identify the first communication state of the first communication circuit 510 as the normal state, when the first service is being executed in a background through the first communication circuit 510 (for example, the first service information detected from the controller part or the host part of the first communication circuit 510 is the file transmission state information). The processor 550 may identify the first communication state of the first communication circuit 510 as the urgent state, when the first service is being executed in a foreground through the first communication circuit 510 (for example, the first service information detected from the controller part or the host part of the first communication circuit 510 is one of the scanning information, the connection information, the voice call state information, or the streaming information).

According to an embodiment of the disclosure, a QoS level may be raised or an operation priority of the first service may be raised, in order of the off state, the idle state, the normal state, and the urgent state. As the QoS level or the priority of an operation is higher, the operation may be a service (or operation) requiring real-timeness or being sensitive to timing.

According to an embodiment of the disclosure, the processor 550 may detect the second communication state of the second communication circuit based on the second information associated with the second service being executed through the second communication circuit 520.

According to an embodiment of the disclosure, the processor 550 may identify the second communication state as one of the off state, the idle state, the normal state, or the urgent state, based on the second information. For the second communication state of the second communication circuit 520, the criterion for identifying the first communication state of the first communication circuit 510 shown in Table 1 may be used as the criterion for identifying the off state, the idle state, the normal state, or the urgent state.

According to an embodiment of the disclosure, the processor 550 may control retransmission of at least a part of data through the first communication circuit 510 based on the detected communication state. For example, the processor 550 may determine a configuration value related to retransmission of at least a part (e.g., a packet) of data through the first communication circuit 510, based on the communication state detected through at least one of the first communication circuit 510 or the second communication circuit 520.

According to an embodiment of the disclosure, the configuration value may include at least one of a retransmission count, a transmission power level, a packet type, or a retransmission time period of the at least a part (e.g., a packet) of the data.

According to an embodiment of the disclosure, the processor 550 may identify a communication state of the first band, based on at least one of the first communication state of the first communication circuit 510 or the second communication state of the second communication circuit 520, and determine a configuration value related to retransmission of the at least a part of the data based on the identified communication state of the first band. An example of the identified communication state of the first band and a preset value (e.g., a retransmission count, a transmission power level, a packet type, or a retransmission time period) corresponding to the communication state of the first band may be as shown in Table 2.

of the first communication circuit 510 is the normal state and the second communication state of the second communication circuit 520 is the off state, the communication state of the first band for transmission (e.g., Service 1) of the at least a part of the data through the first communication circuit 510 may be identified as 'Level 2 (NORMAL)'. When the first communication state of the first communication circuit 510 is the urgent state and the second communication state of the second communication circuit 520 is the off state, the communication state of the first band for transmission (e.g., Service 1) of the at least a part of the data through the first communication circuit 510 may be identified as 'Level 3 (URGENT)'. As such, the communication state of the first band may be identified based on a combination of the first communication state of the first communication circuit 510 and the second communication state of the second communication circuit 520.

According to an embodiment of the disclosure, the designated value for the retransmission count, the transmission power level, the packet type, and the retransmission time period based on the communication state of the first band is not limited to Table 2, and may change with a transmission period of at least a part (e.g., a packet) of the data. According to an embodiment of the disclosure, as the level of the communication state of the first band becomes higher, it may mean that the QoS level of the communication state of the first band for transmission (e.g., Service 1) of the at least a part of the data through the first communication circuit 510

TABLE 2

| WiFi Status (e.g., Second Communication State) | BT Status (e.g., First Communication State) | Bandwith Status (Communication State of First Band) | Number of Windows (Retransmission Count) [$W_{esco}$] | Transmission Power [dB] | Packet Type | Retransmission Time Period [msec] |
|---|---|---|---|---|---|---|
| WiFi off | BT off | NA | NA | NA | NA | NA |
| | BT idle | Level (IDLE) | 10 | 15 dB | EV4 | 16.8 |
| | BT normal | Level 2 (NORMAL) | 6 or 8 | 13 dB | 2-EV3 | 10.8 |
| | BT urgent | Level 3 (URGENT) | 4 | 10 dB | EV3 | 7.5 |
| WiFi idle | BT off | NA | NA | NA | NA | NA |
| | BT idle | Level 1 (IDLE) | 10 | 15 dB | EV4 | 16.8 |
| | BT normal | Level 2 (NORMAL) | 6 or 8 | 13 dB | 2-EV3 | 10.5 |
| | BT urgent | Level 3 (URGENT) | 4 | 10 dB | EV3 | 7.5 |
| WiFi normal | BT off | NA | NA | NA | NA | NA |
| | BT idle | Level 2 (NORMAL) | 6 or 8 | 13 dB | 2-EV3 | 10.5 |
| | BT normal | Level 2 (NORMAL) | 6 or 8 | 13 dB | 2-EV3 | 10.5 |
| | BT urgent | Level 3 (URGENT) | 4 | 10 dB | EV3 | 7.5 |
| WiFi urgent | BT off | NA | NA | NA | NA | NA |
| | BT idle | Level 3 (URGENT) | 4 | 10 dB | EV3 | 7.5 |
| | BT normal | Level 3 (URGENT) | 4 | 10 dB | EV3 | 7.5 |
| | BT urgent | Level 3 (URGENT) | 4 | 10 dB | EV3 | 7.5 |

Referring to Table 2, for example, the identified communication state of the first band may be one of Level 1 (e.g., the idle state), Level 2 (e.g., the normal state), or Level 3 (e.g., the urgent state). For example, referring to Table 2, when both the first communication circuit 510 and the second communication circuit 520 are in the off state, the communication state of the first band for transmission (e.g., Service 1) of at least a part of data through the first communication circuit 510 may be identified as 'NA'. When the first communication state of the first communication circuit 510 is the idle state and the second communication state of the second communication circuit 520 is the off state, the communication state of the first band for transmission (e.g., Service 1) of the at least a part of the data through the first communication circuit 510 may be identified as 'Level 1 (IDLE)'. When the first communication state is high, which may mean that service operations using the first band and resources required for performing the service operations are large. Consequently, the processor 550 may set the retransmission count to decrease, the transmission power level to be lowered, the modulation scheme and transmission speed of the packet type to be lowered, or the retransmission time period to be shortened, as the level of the communication state of the first band increases.

According to an embodiment of the disclosure, the processor 550 may determine a value corresponding to the identified communication state (e.g., level) of the first band as a configuration value associated with retransmission of the at least a part of the data through the first communication circuit 510, based on the value preset based on the level of the communication state of the first band (see a retransmission count, a transmission power level, a packet time, or a retransmission time period of Table 2). The processor 550 may transmit at least a part of data through the first communication circuit 510. When failing to receive a response to transmission of the at least a part of the data through the first communication circuit 510 from the external electronic device 102 or 104, the processor 550 may retransmit the at least a part of the data through the first communication circuit 510 based on the determined configuration value. For example, when the communication state of the first band is 'Level 1 (IDLE)', the processor 550 may determine a retransmission count related to retransmission of the at least a part of the data through the first communication circuit 510 as '10 [$W_{esco}$]' (e.g., a retransmission count of 5 times for bidirectionality), the transmission power level as '15 dB', the packet type as 'EV4' or the retransmission time period as 16.8 msec.

According to an embodiment of the disclosure, as the level of the communication state of the first band increases, a configuration value related to retransmission of the at least a part of the data through the first communication circuit 510, e.g., the retransmission count, the transmission power level, the packet type (the modulation scheme and the transmission speed), or the retransmission time period may be reduced. According to an embodiment of the disclosure, when failing to receive a response to transmission of the at least a part of the data through the first communication circuit 510 from the external electronic device 102 or 104, the processor 550 may retransmit the at least a part of the data as many times as the determined retransmission count. When failing to receive a response to transmission of the at least a part of the data through the first communication circuit 510 from the external electronic device 102 or 104, the processor 550 may retransmit the at least a part of the data at the determined transmission power level (e.g., the transmission power shown in Table 2). When failing to receive a response to transmission of the at least a part of the data through the first communication circuit 510 from the external electronic device 102 or 104, the processor 550 may retransmit the at least a part of the data with the determined packet type (e.g., the packet type shown in Table 2). When failing to receive a response to transmission of the at least a part of the data through the first communication circuit 510 from the external electronic device 102 or 104, the processor 550 may retransmit the at least a part of the data in the determined retransmission time period (e.g., the retransmission time period shown in Table 2).

According to an embodiment of the disclosure, the processor 550 may determine the retransmission count of the at least a part of the data based on the identified communication state of the first band and determine the transmission power level of the at least a part of the data based on the determined retransmission count. For example, based on a reference transmission power level designated for each transmission count, the processor 550 may determine the reference transmission power level corresponding to the determined retransmission count as a transmission power level in retransmission of at least a part of the data. The processor 550 may retransmit the at least a part of the data as many times as the determined retransmission count at the determined transmission power level.

According to an embodiment of the disclosure, the processor 550 may determine a retransmission count or a retransmission time period of the at least a part of the data through the first communication circuit 510 based on the identified communication state of the first band, and determine a packet type into which the packet type of the at least a part of the data is to be changed in retransmission of the at least a part of the data through the first communication circuit 510, based on the determined retransmission count or the determined retransmission time period. When the type of the data is SCO or eSCO, the packet type may be as shown in Table 3.

TABLE 3

| Packet Type | Slot Occupancy | Max. Payload | FEC | Modulation | Symmetric Max. Rate [kb/s] |
|---|---|---|---|---|---|
| EV3 | 1 | 30 | No | GFSK | 96 |
| EV4 | 3 | 120 | 2/3 | GFSK | 192 |
| EV5 | 3 | 180 | No | GFSK | 288 |
| 2EV3 | 1 | 60 | No | π/4-DQPSK | 182 |
| 2EV5 | 3 | 360 | No | π/4-DQPSK | 579 |
| 3EV3 | 1 | 90 | No | 8DPSK | 288 |
| 3EV5 | 3 | 540 | No | 8DPSK | 864 |

Referring to Table 3, when a type of the data is SCO or eSCO, the processor 550 may change a packet type of the at least a part (e.g., a first packet) of the data and retransmit the first packet, when the determined retransmission count is exceeded in retransmission of the at least a part (e.g., the first packet) of the data through the first communication circuit 510 or the processor 550 fails to receive a response to the retransmission from the external electronic device 102 or 104 through the first communication circuit 510 in the determined retransmission period. For example, the processor 550 may determine a packet type having a lower-quality modulation scheme or a lower transmission speed than a packet type corresponding to retransmission of the at least a part (e.g., a packet) of the data through the first communication circuit 510, as a packet type into which the packet type corresponding to the retransmission of the at least a part of the data is to be changed. For example, in retransmission of the at least a part (e.g., the first packet) of the data through the first communication circuit 510 using a packet type of 2EV3 having a transmission speed of about 200 [kb/s] (see Table 3), when the determined retransmission count is exceeded or the processor 550 fails to receive a response to the retransmission of the first packet from the external electronic device 102 or 104 in the determined retransmission period, the processor 550 may determine a packet type having a lower-quality modulation scheme or a lower transmission speed than the packet type of 2EV3 (e.g., EV3 having a transmission speed of about 100 [kb/s], see Table 3), as a packet type into which the packet type of the at least a part of the data is to be changed, in retransmission of the at least a part (e.g., the first packet) of the data through the first communication circuit 510. When failing to receive a response to retransmission of the at least a part (e.g., the first packet) of the data through the first communication circuit 510 from the external electronic device 102 or 104, the processor 550 may retransmit the at least a part (e.g., the first packet) of the data by using the changed packet type.

According to an embodiment of the disclosure, when the type of the data is ACL, the processor 550 may change a packet type of the at least a part (e.g., the first packet) of the data and retransmit the first packet when the determined retransmission count is exceeded in retransmission of the at least a part (e.g., the first packet) of the data through the first communication circuit 510 or the processor 550 fails to receive a response to the retransmission from the external electronic device 102 or 104 through the first communication circuit 510 in the determined retransmission period. When the type of the data is ACL, the packet type may be as shown in Table 4.

TABLE 4

| Packet Type | Payload Header [bytes] | User Payload [bytes] | FEC | CRC | modulation | Symmetric Max. Rate [kb/s] | Asymmetric Max. Rate [kb/s] | |
|---|---|---|---|---|---|---|---|---|
| | | | | | | | Forward | Reverse |
| DM1 | 1 | 0-17 | 2/3 | yes | GFSK | 108.8 | 108.8 | 108.8 |
| DH1 | 1 | 0-27 | No | yes | GFSK | 172.0 | 172.0 | 172.0 |
| DM3 | 2 | 0-121 | 2/3 | yes | GFSK | 258.1 | 387.2 | 54.4 |
| DH3 | 2 | 0-183 | No | yes | GFSK | 390.4 | 586.6 | 86.4 |
| DM5 | 2 | 0-224 | 2/3 | yes | GFSK | 286.7 | 477.8 | 36.3 |
| DH5 | 2 | 0-339 | No | yes | GFSK | 433.9 | 732.2 | 57.6 |
| AUX1 | 1 | 0-29 | No | No | GFSK | 185.6 | 185.6 | 185.6 |
| 2-DH1 | 2 | 0-54 | No | Yes | π/4-DQPSK | 345.6 | 345.6 | 345.6 |
| 2-DH3 | 2 | 0-367 | No | Yes | π/4-DQPSK | 782.9 | 1174.4 | 172.8 |
| 2-DH5 | 2 | 0-679 | No | Yes | π/4-DQPSK | 869.1 | 1448.5 | 115.2 |
| 3-DH1 | 2 | 0-83 | No | Yes | 8DPSK | 531.2 | 531.2 | 531.2 |
| 3-DH3 | 2 | 0-552 | No | yes | 8DPSK | 1177.6 | 1766.4 | 235.6 |
| 3-DH5 | 2 | 0-1021 | No | yes | 8DPSK | 1306.9 | 2178.1 | 177.1 |

Referring to Table 4, in retransmission of the at least a part (e.g., the first packet) of the data through the first communication circuit 510 using a packet type of 2-DH3 having a transmission speed of about 800 [kb/s] (see Table 4), when the determined retransmission count is exceeded or the processor 550 fails to receive a response to the retransmission of the first packet from the external electronic device 102 or 104 in the determined retransmission period, the processor 550 may determine a packet type having a lower-quality modulation scheme or a lower transmission speed than the packet type of 2-DH3 (e.g., DH3 having a transmission speed of about 400 [kb/s], see Table 4), as a packet type into which the packet type of the at least a part of the data is to be changed in retransmission of the at least a part (e.g., the first packet) of the data through the first communication circuit 510. When failing to receive a response to retransmission of the at least a part (e.g., the first packet) of the data through the first communication circuit 510 from the external electronic device 102 or 104, the processor 550 may retransmit the at least a part (e.g., the first packet) of the data by using the changed packet type.

According to an embodiment of the disclosure, the processor 550 may determine based on the identified communication state of the first band, a first retransmission time period to transmit the at least a part of the data therein at a first transmission power level and a second retransmission time period to transmit the at least a part of the data therein at a second transmission power level. The processor 550 may retransmit the at least a part of the data at the first transmission power level in the determined first retransmission time period when failing to receive a response to the retransmission of the at least a part of the data from the external electronic device 102 or 104 through the first communication circuit 510 and retransmit the at least a part of the data at the second transmission power level in the second retransmission time period when failing to receive a response to retransmission of the at least a part of the data from the external electronic device through the first communication circuit 510 in the first retransmission time period.

According to an embodiment of the disclosure, the processor 550 may determine a first retransmission count corresponding to the first retransmission time period and a second retransmission count for the at least a part of the data, which corresponds to the second retransmission time period, based on the identified communication state of the first band. The processor 550 may retransmit the at least a part of the data at the second transmission power level in the second retransmission time period when the retransmission count of the at least a part of the data in the determined first retransmission time period exceeds the first retransmission count, and retransmit the at least a part of the data at the first transmission power level when the retransmission count of the at least a part of the data in the determined second retransmission time period exceeds the second retransmission count. Retransmission of the at least a part of the data based on the determined retransmission time period will be described in more detail with reference to FIGS. 8A and 8B.

According to an embodiment of the disclosure, the processor 550 may stop transmitting or retransmitting the at least a part of the data when receiving reception-impossible state information of the data based on the external electronic device 102 or 104 from the external electronic device 102 or 104. According to an embodiment of the disclosure, the reception-impossible state information of the data based on the external electronic device 102 or 104 may include at least one of information indicating a first communication circuit (not shown) of the external electronic device 102 or 104 is not supported or disabled, information indicating that all supportable communication channels corresponding to the first communication circuit (not shown) of the external electronic device 102 or 104 are being used, or information (e.g., flow control stop) indicating a data processing-impossible state due to a system load of the external electronic device 102 or 104.

An operation of the processor 550 will be described in more detail with reference to FIGS. 9 through 16.

Figure 6:
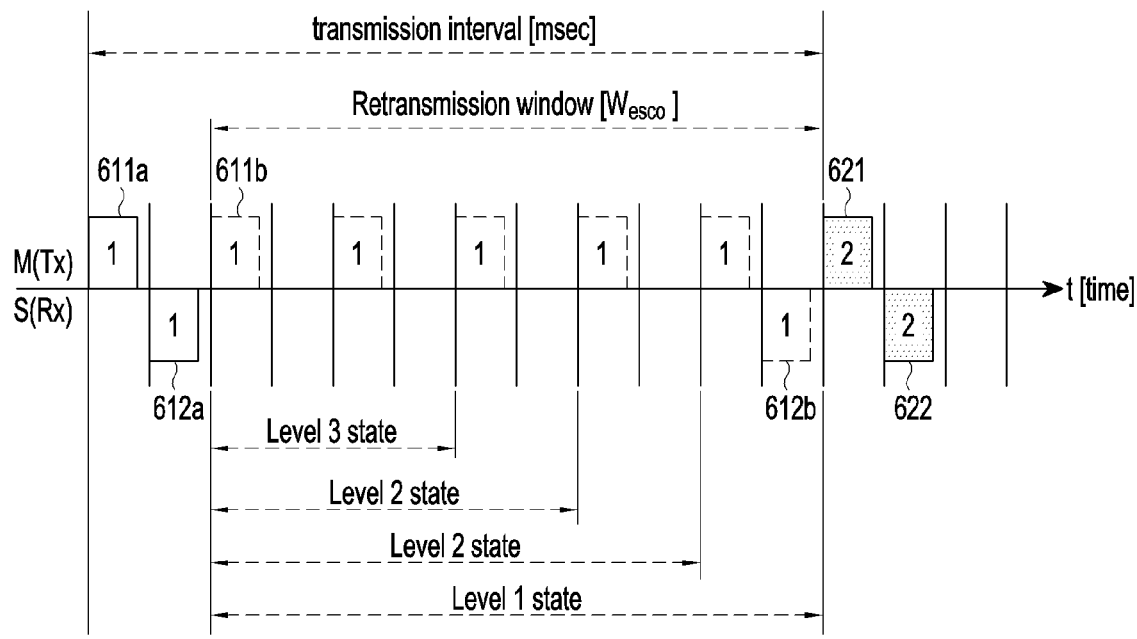
FIG. 6 is a view for describing a method for determining a retransmission count of Bluetooth-based data in an electronic device, according to various embodiments of the disclosure.

FIG. 6 is a view for describing a method for determining a retransmission count of Bluetooth-based data in an electronic device, according to various embodiments of the disclosure. The electronic device may include the entire electronic device 501 illustrated in FIG. 5 or a part thereof. Illustrated in FIG. 6 is transmission of at least a part (e.g., a packet) of data to be transmitted to an external electronic device (e.g., the electronic device 102 or 104) through a first communication circuit (e.g., the first communication circuit 510) using a first band of the electronic device 501 when a type of the data is SCO or eSCO. In FIG. 6, it is assumed that the electronic device 501 is a master device and the external electronic device 102 or 104 is a slave device.

According to an embodiment of the disclosure, the electronic device 501 may determine a retransmission count among a configuration value related to retransmission of at least a part (e.g., a packet) of the data, based on the communication state of the first band identified based on the communication state of at least one of the first communication circuit 510 transmitting the at least a part (e.g., the packet) of the data or the second communication circuit (e.g., the second communication circuit 520) using the first band.

Referring to FIG. 6, the electronic device 501 may transmit a first packet 611a of the data to the external electronic device 102 or 104 by using one slot through the first communication circuit 510 using the first band. The electronic device 501 may determine that the first packet 611a has been successfully transmitted, upon receiving a first reception packet 612a in response to the first packet 611a from the external electronic device 102 or 104 after transmitting the first packet 611a. The electronic device 501 may determine that transmission of a first packet 611b has failed, and retransmit the first packet 611b, when failing to receive a response to the first packet 611a from the external electronic devoice 102 or 104 after transmitting the first packet 611a.

According to an embodiment of the disclosure, the electronic device 501 may determine the retransmission count based on the identified communication state of the first band. For example, the electronic device 501 may set the retransmission count to 5 when the communication state of the first band is Level 1, set the retransmission count to 3 or 4 when the communication state of the first band is Level 2, and set the retransmission count to 2 when the communication state of the first band is Level 3. According to an embodiment of the disclosure, as the level of the communication state of the first band becomes higher, it may mean that the QoS level of the communication state of the first band is high, which may mean that service operations using the first band and resources required for performing the service operations are large. Thus, as the level of the communication state of the first band increases, the retransmission count may decrease.

According to an embodiment of the disclosure, the electronic device 501 may transmit a second packet 621 of the data to the external electronic device 102 or 104 by determining that the first packet 611b has been successfully transmitted, upon receiving a first reception packet 612b in response to retransmission of the first packet 611b and receive a second reception packet 622 in response to the second packet 621 from the external electronic device 102 or 104.

Figure 7:
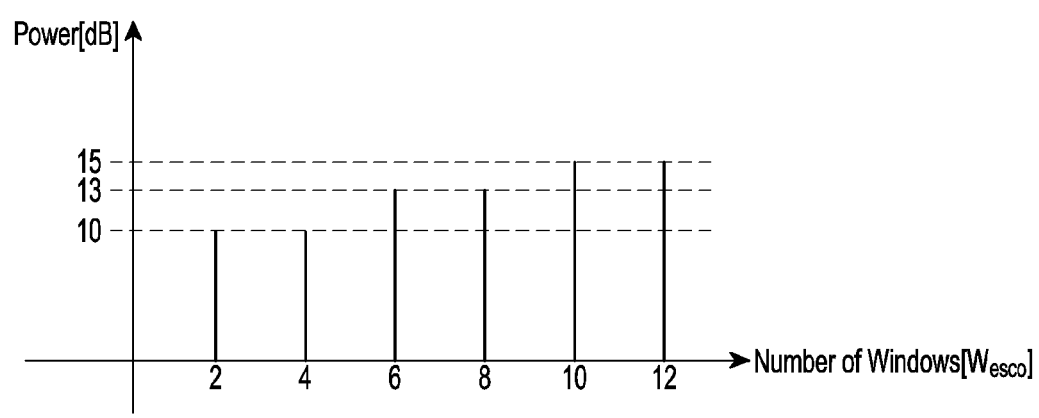
FIG. 7 is a view for describing a method for determining a transmission power level of Bluetooth-based data in an electronic device, according to various embodiments of the disclosure.

FIG. 7 is a view for describing a method for determining a transmission power level of Bluetooth-based data in an electronic device, according to various embodiments of the disclosure. The electronic device may include the entire electronic device 501 illustrated in FIG. 5 or a part thereof. Illustrated in FIG. 7 is a transmission power level with respect to the number of windows in transmission or retransmission of at least a part (e.g., a packet) of data to be transmitted to an external electronic device (e.g., the electronic device 102 or 104) through a first communication circuit (e.g., the first communication circuit 510) using the first band of the electronic device 501.

According to an embodiment of the disclosure, the electronic device 501 may determine a retransmission count and a power transmission level among a configuration value related to retransmission of at least a part (e.g., a packet) of the data, based on the communication state of the first band identified based on the communication state of at least one of the first communication circuit 510 transmitting the at least a part (e.g., the packet) of the data or the second communication circuit (e.g., the second communication circuit 520) using the first band.

Referring to FIG. 7, the electronic device 501 may transmit data at different transmission power levels according to a retransmission count. The retransmission count may correspond to the number of windows in which at least a part (e.g., the first packet) of the data is transmitted. For bidirectional communication, when the number of windows is 2, it may be defined that transmission and reception of the first packet of the data correspond to the respective windows, such that the first packet is transmitted once. For example, when the number of windows is 2, a transmission count for the first packet of the data is 1, and in this case, a transmission power of the first packet of the data may be set to 10 dB. When the number of windows is 8, a transmission count for the first packet of the data is 4, and in this case, a transmission power of the first packet of the data may be set to 13 dB. When the number of windows is 10, a transmission count for the first packet of the data is 5, and in this case, a transmission power of the first packet of the data may be set to 15 dB.

According to an embodiment of the disclosure, as the retransmission count of the at least a part (e.g., the first packet) of the data decreases, it may mean that the QoS level of the communication state of the first band for transmission of the at least a part of the data through the first communication circuit 510 is high, which may mean that service operations using the first band and resources required for performing the service operations are large. Consequently, the processor 550 may transmit the at least a part (e.g., the first packet) of the data by lowering the transmission power level as the retransmission count decreases.

Figure 8A:
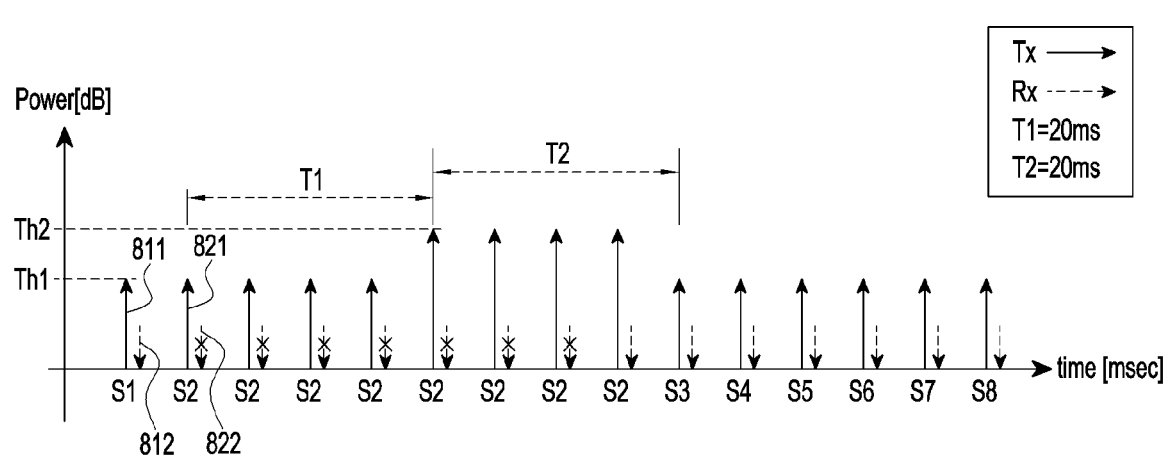
FIGS. 8A and 8B are views for describing a method for determining a retransmission time period of Bluetooth-based data in an electronic device, according to various embodiments of the disclosure.
Figure 8B:
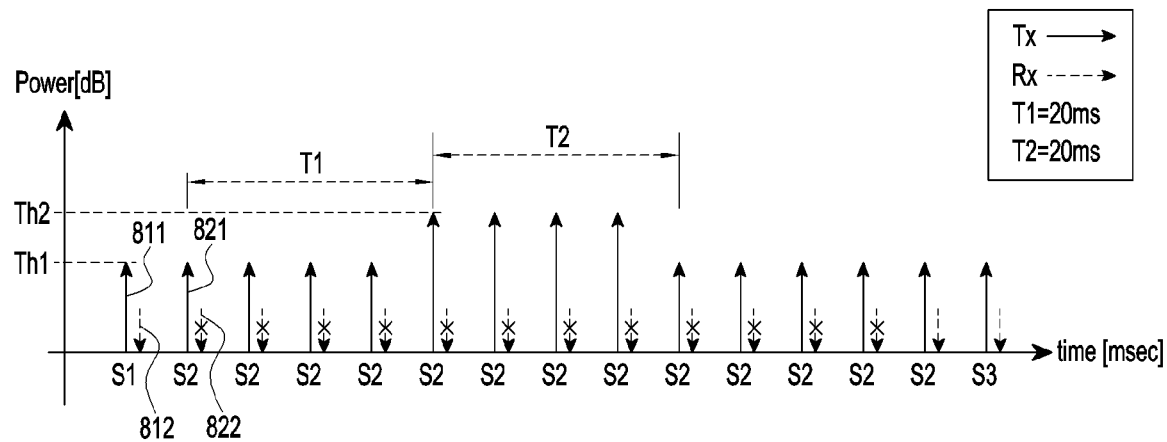

FIGS. 8A and 8B are views for describing a method for determining a retransmission time period of Bluetooth-based data in an electronic device, according to various embodiments of the disclosure. The electronic device may include the entire electronic device 501 illustrated in FIG. 5 or a part thereof.

In FIGS. 8A and 8B, S may indicate at least a part (e.g., a packet) of data to be transmitted to an external electronic device (e.g., the electronic device 102 or 104) through a first communication circuit (e.g., the first communication circuit 510) using the first band of the electronic device 501, in which S1 through S8 may indicate a first packet through an eighth packet of the data, respectively. Transmission Tx 811 (marked with a solid arrow) of the packet (e.g., the first packet S1) and reception Rx 812 (marked with a dotted arrow) corresponding to the transmission Tx 811 from the external electronic device 102 or 104 are also illustrated, in which when a response to transmission Tx (e.g., transmission 821 of a second packet S2) is not received, corresponding reception Rx (e.g., reception 822 of the second packet S2) is marked with 'x'.

According to an embodiment of the disclosure, the electronic device 501 may determine a retransmission time period or a retransmission count corresponding thereto among a configuration value related to retransmission of at least a part (e.g., a packet) of the data, based on the communication state of the first band identified based on the communication state of at least one of the communication circuit (e.g., the first communication circuit 510) transmitting the at least a part (e.g., the packet) of the data or the second communication circuit (e.g., the second communication circuit 520) using the first band.

Referring to FIG. 8A, the electronic device 501 may determine based on the communication state of the first band, a first retransmission time period T1 to transmit at least a part (e.g., the second packet S2) of the data therein at a first transmission power level Th1 and a second retransmission time period T2 to transmit the at least a part of the data therein at a second transmission power level Th2 greater than the first transmission power level Th1.

According to an embodiment of the disclosure, when failing to receive a response to transmission of the at least a part (e.g., the second packet S2) of the data through the first communication circuit 510 from the external electronic device 102 or 104, the electronic device 501 may retransmit the at least a part (e.g., the second packet S2) of the data at the first transmission power level Th1 in the determined first retransmission time period T1.

According to an embodiment of the disclosure, when failing to receive a response to retransmission of the at least a part (e.g., the second packet S2) of the data through the first communication circuit 510 from the external electronic device 102 or 104 in the first retransmission time period T1, the electronic device 501 may retransmit the at least a part (e.g., the second packet S2) of the data at the second transmission power level Th2 in the determined second retransmission time period T2. When receiving a response to retransmission of the at least a part (e.g., the second packet S2) of the data at the second transmission power level Th2 in the second retransmission time period T2, the electronic device 501 may transmit at least another part (e.g., a third packet S3) of the data at the first transmission power level Th1.

According to an embodiment of the disclosure, the first retransmission time period T1 and the second retransmission time period T2 may be set shorter than a maximum transmission interval for transmitting the at least a part (e.g., a packet) of the data without interruption of a sound based on a type of the data. For example, when the type of the data is SCO or eSCO, the maximum transmission interval may be about 7.5 through 20 msec, and when the type of the data is ACL, the maximum transmission interval may be about 20 to 40 msec.

According to an embodiment of the disclosure, the electronic device 501 may determine a retransmission time period and a retransmission count among a configuration value related to retransmission of at least a part (e.g., a packet) of the data, based on the communication state of the first band identified based on the communication state of at least one of the first communication circuit 510 transmitting the packet of the data or the second communication circuit 520 using the first band.

Referring to FIG. 8B, the electronic device 501 may determine based on the communication state of the first band, a first retransmission time period T1 to transmit at least a part (e.g., the second packet S2) of the data therein at a first transmission power level Th1 and a second retransmission time period T2 to transmit the at least a part of the data therein at a second transmission power level Th2 greater than the first transmission power level Th1.

According to an embodiment of the disclosure, the first retransmission time period T1 and the second retransmission time period T2 may be set shorter than a maximum transmission interval for transmitting the at least a part (e.g., a packet) of the data without interruption of a sound based on a type of the data. For example, when the type of the data is SCO or eSCO, the maximum transmission interval may be about 7.5 through 20 msec, and when the type of the data is ACL, the maximum transmission interval may be about 20 to 40 msec.

According to an embodiment of the disclosure, the electronic device 501 may determine a first retransmission count corresponding to the first retransmission time period T1 and a second retransmission count for the at least a part of the data, which corresponds to the second retransmission time period T2, based on the identified communication state of the first band.

According to an embodiment of the disclosure, the first retransmission count may be set to limit a retransmission count in the first retransmission time period T1 such that when retransmission of the at least a part (e.g., the second packet S2) of the data fails in the first retransmission time period T1, the second packet S2 is retransmitted by raising a transmission power level. According to an embodiment of the disclosure, the first retransmission count may be previously set by a user or may be previously designated by the electronic device.

According to an embodiment of the disclosure, the second retransmission count may be set to limit a retransmission count in the second retransmission time period such that when retransmission of the at least a part of the data fails in the second retransmission time period, the at least a part of the data is retransmitted by lowering a transmission power level. According to an embodiment of the disclosure, the second retransmission count may be previously set by a user or may be previously designated by the electronic device 501.

According to an embodiment of the disclosure, the first retransmission count and the second retransmission count may be determined based on a retransmission count determined based on the communication state of the first band. For example, the electronic device 501 may determine at least a part of the retransmission count determined based on the communication state of the first band as the first retransmission count and another part of the determined retransmission count as the second retransmission count.

The electronic 501 may retransmit the at least a part (e.g., the second packet S2) of the data at the second transmission power level Th2 in the second retransmission time period T2 when the retransmission count of the at least a part (e.g., the second packet S2) of the data in the determined first retransmission time period T1 exceeds the first retransmission count. The electronic device 501 may retransmit the at least a part (e.g., the second packet S2) of the data at the first transmission power level Th1 when the retransmission count of the at least a part (e.g., the second packet S2) of the data in the determined second retransmission time period T2 exceeds the second retransmission count. When retransmission of the at least a part (e.g., the second packet S2) of the data in the second retransmission time period T2 fails, unnecessary power consumption may be prevented by lowering a transmission power level from the second transmission power level back to the first transmission power level in retransmission of the at least a part (e.g., the second packet S2) of the data.

According to various embodiments of the disclosure, an electronic device (e.g., the electronic device 501) transmitting Bluetooth-based data may include a housing (not shown), the first communication circuit 510 which is located in the housing (not shown) and uses the first band, the second communication circuit 520 which is located in the housing (not shown) and uses the first band, the processor 550 which is located in the housing (not shown) and electrically connected to the first communication circuit 510 and the second communication circuit 520, and a memory (e.g., the memory 530) electrically connected to the processor 550. The memory 530 may store instructions that cause, when executed, the processor 550 to detect a communication state of at least one of the first communication circuit 510 or the second communication circuit 520 and to control retransmission of at least a part (e.g., a packet) of data to an external electronic device (e.g., the electronic device 102 or 104) through the first communication circuit 510, based on the detected communication state.

According to various embodiments of the disclosure, the first communication circuit 510 may perform Bluetooth communication, and the second communication circuit 520 may perform Wi-Fi communication.

According to various embodiments of the disclosure, the data may include audio data.

According to various embodiments of the disclosure, the instructions may include instructions that cause the processor 550 to determine a configuration value related to the retransmission based on the detected communication state, to transmit the at least a part of the data through the first communication circuit 510, and to retransmit the at least a part of the data according to the determined configuration value when failing to receive a response to transmission of the at least a part of the data from the external electronic device 102 or 104 through the first communication circuit 510.

According to various embodiments of the disclosure, the configuration value may include at least one of a retransmission count, a transmission power level, a packet type, or a retransmission time period.

According to various embodiments of the disclosure, the data may include at least one packet, each of which may be transmitted or retransmitted using at least one slot, and the configuration value may be determined for each packet corresponding to the at least a part of the data.

According to various embodiments of the disclosure, the instructions may include instructions that cause the processor 550 to identify the communication state of the first band, based on at least one of the first communication state of the first communication circuit, which is detected based on the first information related to the first service being executed through the first communication circuit 510, or the second communication state of the second communication circuit, which is detected based on the second information related to the second service being executed through the second communication circuit 520, and to determine at least one of the retransmission count, the transmission power level, the packet type, or the retransmission time period, based on the identified communication state of the first band.

According to various embodiments of the disclosure, the first information may include at least some of the first service information, the first resource information, the first traffic information, the first data loss information, or the first buffer state information, which corresponds to the first service. According to various embodiments of the disclosure, the second information may include at least some of the second service information, the second resource information, the second traffic information, the second data loss information, or the second buffer state information, which corresponds to the second service.

According to various embodiments of the disclosure, the instructions may include instructions that cause the processor 550 to identify the communication state of the first band, based on at least one of the first communication state of the first communication circuit 510, which is detected based on the first information related to the first service being executed through the first communication circuit 510, or the second communication state of the second communication circuit 520, which is detected based on the second information related to the second service being executed through the second communication circuit 520, to determine a retransmission count of the at least a part of the data based on the identified communication state of the first band, and to determine a reference transmission power level corresponding to the determined retransmission count as a transmission power level for retransmission of the at least a part of the data based on a reference transmission power level designated for each retransmission count.

According to various embodiments of the disclosure, the instructions may include instructions that cause the processor 550 to identify the communication state of the first band, based on at least one of the first communication state of the first communication circuit 510, which is detected based on the first information related to the first service being executed through the first communication circuit 510, or the second communication state of the second communication circuit 520, which is detected based on the second information related to the second service being executed through the second communication circuit 520, to determine a retransmission count or a retransmission time period of the at least a part of the data based on the identified communication state of the first band, and to change a packet type of the at least a part of the data in retransmission of the at least a part of the data based on the determined retransmission count or the determined retransmission time period.

According to various embodiments of the disclosure, the instructions may include instructions that cause the processor 550 to stop transmitting or retransmitting the at least a part of the data when receiving reception-impossible state information of the data based on the external electronic device 102 or 104 from the external electronic device 102 or 104.

According to various embodiments of the disclosure, the instructions may include instructions that cause the processor 550 to identify the communication state of the first band, based on at least one of the first communication state of the first communication circuit 510, which is detected based on the first information related to the first service being executed through the first communication circuit 510, or the second communication state of the second communication circuit 520, which is detected based on the second information related to the second service being executed through the second communication circuit 520, to determine the first retransmission time period in which the at least a part of the data is retransmitted at the first transmission power level based on the identified communication state of the first band, and to determine the second retransmission time period in which the at least a part of the data is retransmitted at the second transmission power level higher than the first transmission power level based on the identified communication state of the first band.

According to various embodiments of the disclosure, the instructions may include instructions that cause the processor 550 to retransmit the at least a part of the data at the first transmission power level in the determined first retransmission time period and to retransmit the at least a part of the data at the second transmission power level during the second retransmission time period when failing to receive a response to retransmission of the at least a part of the data from the external electronic device through the first communication circuit 510 in the first retransmission time period.

According to various embodiments of the disclosure, the instructions may include instructions that cause the processor 550 to identify the communication state of the first band, based on at least one of the first communication state of the first communication circuit 510, which is detected based on the first information related to the first service being executed through the first communication circuit 510, or the second communication state of the second communication circuit 520, which is detected based on the second information related to the second service being executed through the second communication circuit 520, to determine the first retransmission time period in which the at least a part of the data is retransmitted at the first transmission power level and the second retransmission time period in which the at least a part of the data is retransmitted at the second transmission power level higher than the first transmission power level based on the identified communication state of the first band, and to determine the first retransmission count corresponding to the first retransmission time period and the second retransmission count of the at least a part of the data, which corresponds to the second retransmission time period based on the identified communication state of the first band.

According to various embodiments of the disclosure, the instructions may include instructions that cause the processor 550 to retransmit the at least a part of the data at the second transmission power level in the second retransmission time period when the retransmission count of the at least a part of the data in the determined first retransmission time period exceeds the first retransmission count, and to retransmit the at least a part of the data at the first transmission power level when the retransmission count of the at least a part of the data in the determined second retransmission time period exceeds the second retransmission count.

Figure 9:
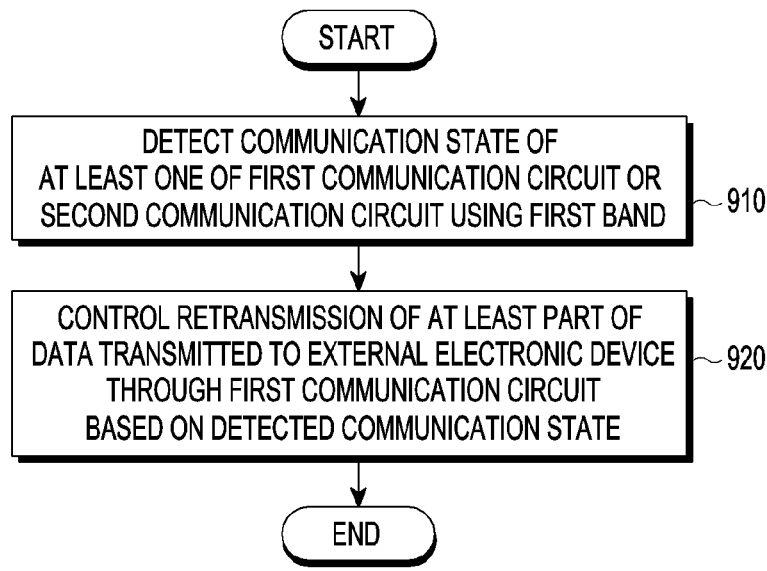
FIG. 9 is a flowchart illustrating a method for transmitting Bluetooth-based data in an electronic device according to various embodiments of the disclosure.

FIG. 9 is a flowchart illustrating a method for transmitting Bluetooth-based data in an electronic device according to various embodiments of the disclosure. The method may be performed by at least one of the electronic device (e.g., the electronic device 501) or the processor (e.g., the processor 550) of the electronic device.

In operation 910, the processor may detect a communication state of at least one of the first communication circuit (e.g., the first communication circuit 510) using the first band or the second communication circuit (e.g., the second communication circuit 520) using the first band.

For example, the processor may detect a communication state of each communication circuit based on a service being executed through the communication circuit. The processor may identify the communication state of the first band based on the communication state of at least one of the first communication circuit or the second communication circuit. According to an embodiment of the disclosure, the processor may identify the communication state of the first band, based on at least one of the first communication state detected corresponding to the first communication circuit or the second communication state detected through the second communication circuit. According to an embodiment of the disclosure, the processor may determine the identified communication state of the first band as one of Level 1 (e.g., the idle state), Level 2 (e.g., the normal state), or Level 3 (e.g., the urgent state). For the identified communication state of the first band, Table 2 will be referred to.

According to an embodiment of the disclosure, the first band may be an ISM 2.4 GHz band or 5 GHz band. According to an embodiment of the disclosure, the first communication circuit may perform Bluetooth communication. According to an embodiment of the disclosure, the first communication circuit may perform Wi-Fi communication. According to an embodiment of the disclosure, the second communication circuit may perform wired/wireless communication in various forms such as ZigBee or BLE using the same first band as Bluetooth, as well as Wi-Fi-based communication.

In operation 920, the processor may control retransmission of at least a part of data through the first communication circuit based on the detected communication state.

For example, the processor may determine a configuration value related to the retransmission based on the detected communication state. The processor may transmit the at least a part of the data through the first communication circuit. When failing to receive a response to transmission of the at least a part of the data through the first communication circuit from the external electronic device, the processor may retransmit the at least a part of the data according to the determined configuration value.

According to an embodiment of the disclosure, the configuration value may include at least one of a retransmission count, a transmission power level, a packet type, or a retransmission time period of the at least a part of the data. According to an embodiment of the disclosure, when failing to receive a response to transmission of the at least a part of the data through the first communication circuit from the external electronic device (e.g., the electronic device 102 or 104), the processor may retransmit the at least a part of the data as many times as the determined retransmission count. When failing to receive a response to transmission of the at least a part of the data through the first communication circuit from the external electronic device, the processor of the electronic device may retransmit the at least a part of the data at the determined transmission power level. When failing to receive a response to transmission of the at least a part of the data through the first communication circuit from the external electronic device, the processor of the electronic device may retransmit the at least a part of the data with the determined packet type. When failing to receive a response to transmission of the at least a part of the data through the first communication circuit from the external electronic device, the processor of the electronic device may retransmit the at least a part of the data in the determined retransmission time period.

According to an embodiment of the disclosure, the processor may determine the retransmission count of the at least a part of the data based on the identified communication state of the first band and determine the transmission power level of the at least a part of the data based on the determined retransmission count. For example, based on a reference transmission power level designated for each transmission count, the processor may determine the reference transmission power level corresponding to the determined retransmission count as a transmission power level in retransmission of at least a part of the data. The processor may retransmit the at least a part of the data as many times as the determined retransmission count at the determined transmission power level.

According to an embodiment of the disclosure, the processor may determine a retransmission count or a retransmission time period of the at least a part of the data based on the identified communication state of the first band, and change a packet type of the data in retransmission of the at least a part of the data based on the determined retransmission count or the determined retransmission time period. When failing to receive a response to transmission of the at least a part of the data through the first communication circuit from the external electronic device, the processor may retransmit the at least a part of the data with the changed packet type.

According to an embodiment of the disclosure, the processor may determine based on the identified communication state of the first band, a first retransmission time period to transmit the at least a part of the data therein at a first transmission power level and a second retransmission time period to transmit the at least a part of the data therein at a second transmission power level. The processor of the electronic device may retransmit the at least a part of the data at the first transmission power level in the determined first retransmission time period when failing to receive a response to transmission of the at least a part of the data from the external electronic device through the first communication circuit, and retransmit the at least a part of the data at the second transmission power level in the second retransmission time period when failing to receive a response to retransmission of the at least a part of the data from the external electronic device through the first communication circuit 510 in the first retransmission time period.

According to an embodiment of the disclosure, the processor may determine based on the identified communication state of the first band, a first retransmission time period to transmit the at least a part of the data therein at a first transmission power level and a second retransmission time period to transmit the at least a part of the data therein at a second transmission power level. The processor may determine a first retransmission count corresponding to the first retransmission time period and a second retransmission count for the at least a part of the data, which corresponds to the second retransmission time period, based on the identified communication state of the first band. The processor may retransmit the at least a part of the data at the second transmission power level in the second retransmission time period when the retransmission count of the at least a part of the data in the determined first retransmission time period exceeds the first retransmission count, and retransmit the at least a part of the data at the first transmission power level when the retransmission count of the at least a part of the data in the determined second retransmission time period exceeds the second retransmission count.

Figure 10:
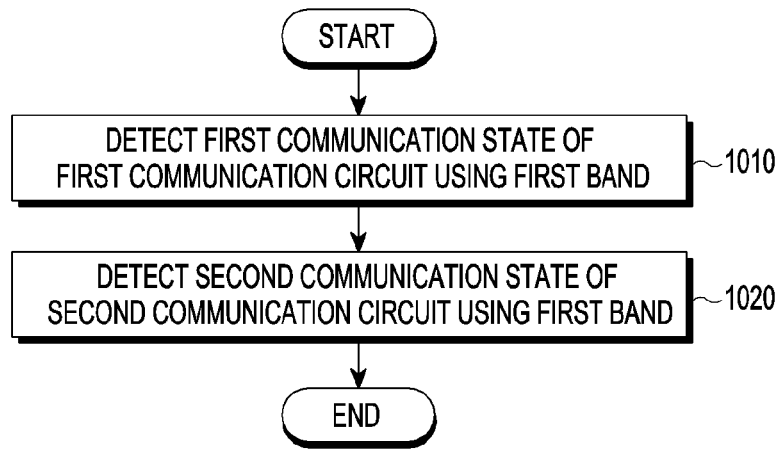
FIG. 10 is a flowchart illustrating a method for transmitting Bluetooth-based data in an electronic device according to various embodiments of the disclosure.

FIG. 10 is a flowchart illustrating a method for transmitting Bluetooth-based data in an electronic device according to various embodiments of the disclosure. FIG. 10 is a detailed flowchart illustrating an operation of detecting a communication state of at least one of a first communication circuit or a second communication circuit in operation 910 shown in FIG. 9, in which the method may be performed by at least one of an electronic device (e.g., the electronic device 501) or a processor (e.g., the processor 550) of the electronic device.

In operation 1010, the processor may detect the first communication state of the first communication circuit based on the first information associated with the first service being executed through the first communication circuit (e.g., the first communication circuit 510) using the first band. For example, the processor may detect the first communication state of the first communication circuit using the first band.

According to an embodiment of the disclosure, the first information may include first service information corresponding to the first service being executed through the first communication circuit. The first service information may be information associated with the first service executed by the controller part or the host part of the first communication circuit, e.g., at least some of scanning information, connection information, voice call state information, streaming information, or file transmission state information.

According to an embodiment of the disclosure, the first information may further include at least some of the first resource information required for executing the first service, the first traffic information, the first data loss information, or the first buffer state information.

The first resource information may include all resources (e.g., consumed current, consumed power, etc.) used for providing the first service being executed. The first traffic information may include a transmission rate, a transmission error rate, a delay time, etc., of the first communication circuit. The first data loss information may include a PER or a BER of data corresponding to the first service. The first buffer state information may include state information of the first buffer (e.g., the first buffer 516) of the first communication circuit 510 in which the data corresponding to the first service temporarily waits, and for example, the processor may detect the first buffer state information based on the number of queues temporarily waiting in the first buffer of the first communication circuit.

According to an embodiment of the disclosure, the processor may detect the first communication state of the first communication circuit as one of the off state, the idle state, the normal state, or the urgent state, based on the first information. For example, the processor may identify the first communication state of the first communication circuit as the off state (e.g., Not Available (NA)), when the first communication circuit is deactivated. The processor may identify the first communication state of the first communication circuit as the idle state, when the first communication circuit is activated, but there is no first service being executed through the first communication circuit (for example, the first service information is not detected from the controller part or the host part of the first communication circuit). The processor may identify the first communication state of the first communication circuit as the normal state, when the first service is being executed in a background through the first communication circuit (for example, the first service information detected from the controller part or the host part of the first communication circuit is the file transmission state information). The processor may identify the first communication state of the first communication circuit as the urgent state, when the first service is being executed in a foreground through the first communication circuit (for example, the first service information detected from the controller part or the host part of the first communication circuit is one of the scanning information, the connection information, the voice call state information, or the streaming information).

According to an embodiment of the disclosure, a QoS level may be raised or an operation priority of the first service may be raised, in order of the off state, the idle state, the normal state, and the urgent state of the first communication circuit. As the QoS level or the priority of an operation is higher, the operation may require real-timeness or being sensitive to timing.

In operation 1020, the processor may detect the second communication state of the second communication circuit based on the second information associated with the second service being executed through the second communication circuit (e.g., the second communication circuit 520) using the first band. For example, the processor may detect the second communication state of the second communication circuit using the first band.

According to an embodiment of the disclosure, the second information may include second service information corresponding to the second service being executed through the second communication circuit. The second service information may be information associated with the second service executed by the controller part or the host part of the second communication circuit, e.g., at least some of scanning information, connection information, voice call state information, streaming information, or file transmission state information.

According to an embodiment of the disclosure, the second information may further include at least some of the second resource information required for executing the second service, the second traffic information, the second data loss information, or the second buffer state information. The second resource information may include all resources (e.g., consumed current, consumed power, etc.) used for providing the second service being executed. The second traffic information may include a transmission rate, a transmission error rate, a delay time, etc., of the second communication circuit. The second data loss information may include a PER or a BER of data corresponding to the second service. The second buffer state information may include state information of the first buffer (e.g., the first buffer 516) of the second communication circuit in which the data corresponding to the second service temporarily waits, and for example, the processor may detect the second buffer state information based on the number of queues temporarily waiting in the second buffer of the second communication circuit.

According to an embodiment of the disclosure, the processor may detect the second communication state of the second communication circuit as one of the off state, the idle state, the normal state, or the urgent state, based on the second information. For example, the processor may identify the second communication state of the second communication circuit as the off state (e.g., Not Available (NA)), when the second communication circuit is deactivated. The processor may identify the second communication state of the second communication circuit as the idle state, when the second communication circuit is activated, but there is no second service being executed through the second communication circuit (for example, the second service information is not detected from the controller part or the host part of the second communication circuit). The processor may identify the second communication state of the second communication circuit as the normal state, when the first service is being executed in a background through the second communication circuit (for example, the first service information detected from the controller part or the host part of the first communication circuit is the file transmission state information). The processor may identify the second communication state of the second communication circuit as the urgent state, when the second service is being executed in a foreground through the second communication circuit (for example, the first service information detected from the controller part or the host part of the first communication circuit is one of the scanning information, the connection information, the voice call state information, or the streaming information).

According to an embodiment of the disclosure, a QoS level may be raised or an operation priority of the first service may be raised, in order of the off state, the idle state, the normal state, and the urgent state of the second communication circuit. As the QoS level or the priority of an operation is higher, the operation may require real-timeness or being sensitive to timing.

Figure 11:
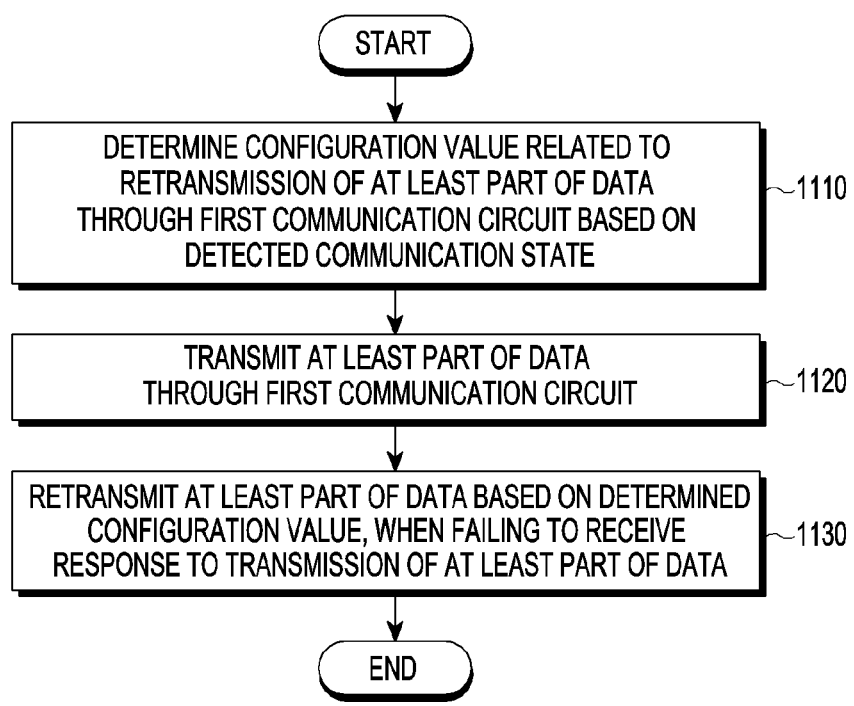
FIG. 11 is a flowchart illustrating a method for transmitting Bluetooth-based data in an electronic device according to various embodiments of the disclosure.

FIG. 11 is a flowchart illustrating a method for transmitting Bluetooth-based data in an electronic device according to various embodiments of the disclosure. FIG. 11 is a detailed flowchart illustrating an operation of controlling retransmission of at least a part of data in operation 920 shown in FIG. 9, in which the method may be performed by at least one of an electronic device (e.g., the electronic device 501) or a processor (e.g., the processor 550) of the electronic device.

In operation 1110, the processor may determine a configuration value related to retransmission of the at least a part of the data through the first communication circuit, based on the communication state detected through at least one of the first communication circuit (e.g., the first communication circuit 510) using the first band or the second communication circuit (e.g., the second communication circuit 520) using the first band. For example, the processor may determine a configuration value used for retransmission of the at least a part of the data through the first communication circuit based on the detected communication state.

According to an embodiment of the disclosure, the configuration value may include at least one of a retransmission count, a transmission power level, a packet type, or a retransmission time period of the at least a part of the data.

According to an embodiment of the disclosure, the processor may identify a communication state of the first band, based on at least one of the first communication state of the first communication circuit or the second communication state of the second communication circuit, and determine a configuration value related to retransmission of the at least a part of the data based on the identified communication state of the first band. According to an embodiment of the disclosure, the identified communication state of the first band may be one of Level 1 (e.g., the idle state), Level 2 (e.g., the normal state), or Level 3 (e.g., the urgent state), and the processor may previously designate a value corresponding to a retransmission count, a transmission power level, a packet type, or a retransmission time period according to a level of the communication state. The value designated for the retransmission count, the transmission power level, the packet type, or the retransmission time period may refer to Table 2. The processor may determine a value corresponding to the communication state (e.g., the level) of the first band as a configuration value related to retransmission of the at least a part of the data, based on the value designated according to the level of the communication state of the first band.

In operation 1120, the processor may transmit the at least a part of the data through the first communication circuit.

According to an embodiment of the disclosure, the processor may transmit the at least a part of the data at the transmission power level corresponding to the detected communication state of the first band by referring to a transmission power level previously designated for each retransmission count.

In operation 1130, when failing to receive a response to transmission of the at least a part of the data through the first communication circuit from the external electronic device (e.g., the electronic device 102 or 104), the processor may retransmit the at least a part of the data based on the determined configuration value. For example, when failing to receive a response to transmission of the at least a part of the data through the first communication circuit from the external electronic device, the processor may retransmit the at least a part of the data based on the determined configuration value.

Figure 12:
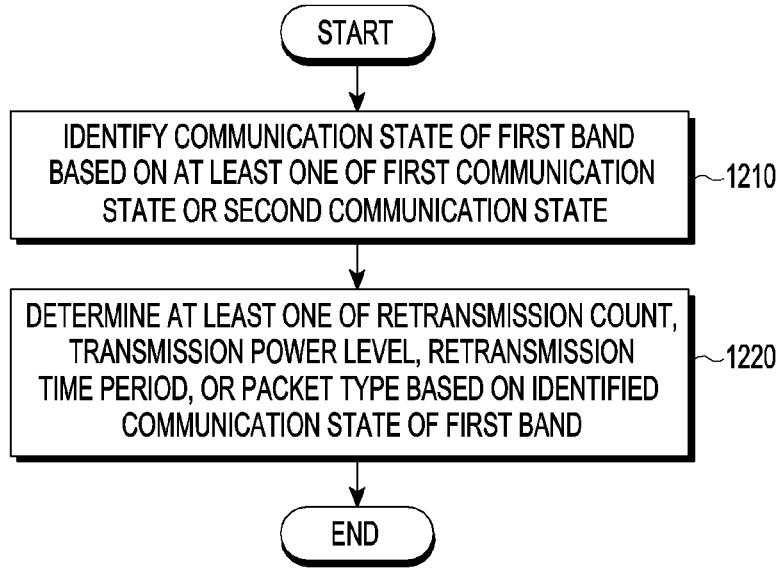
FIG. 12 is a flowchart illustrating a method for transmitting Bluetooth-based data in an electronic device according to various embodiments of the disclosure.

FIG. 12 is a flowchart illustrating a method for transmitting Bluetooth-based data in an electronic device according to various embodiments of the disclosure. FIG. 12 is a detailed flowchart illustrating an operation of determining a configuration value related to retransmission of data in operation 1110 shown in FIG. 11, in which the method may be performed by at least one of an electronic device (e.g., the electronic device 501) or a processor (e.g., the processor 550) of the electronic device.

In operation 1210, the processor may identify the communication state of the first band, based on at least one of the first communication state of the first communication circuit (e.g., the first communication circuit 510) using the first band or the second communication state of the second communication circuit (e.g., the second communication circuit 520) using the first band. For example, the processor may identify the communication state of the first band based on at least one of the first communication state or the second communication state.

According to an embodiment of the disclosure, the communication state of the first band may be one of Level 1 (e.g., the idle state), Level 2 (e.g., the normal state), or Level 3 (e.g., the urgent state). For example, the communication state of the first band for transmission (e.g., Service 1) of the at least a part of the data through the first communication circuit may be identified based on a combination of the first communication state of the first communication circuit capable of performing an operation (e.g., Service 2) that is different from Service 1 through the first communication circuit and the second communication state of the second communication circuit capable of performing an operation (e.g., Service 3) that is different from Service 1 and Service 2 through the second communication circuit. For the communication state of the first band, Table 2 will be referred to.

For example, referring to Table 2, when both the first communication circuit and the second communication circuit are in the off state, the communication state of the first band for transmission (e.g., Service 1) of at least a part of data through the first communication circuit may be identified as 'NA'. When the first communication state of the first communication circuit is the idle state and the second communication state of the second communication circuit is the off state, the communication state of the first band for transmission (e.g., Service 1) of the at least a part of the data through the first communication circuit may be identified as 'Level 1 (IDLE)'. When the first communication state of the first communication circuit is the normal state and the second communication state of the second communication circuit is the off state, the communication state of the first band for transmission (e.g., Service 1) of the at least a part of the data through the first communication circuit may be identified as 'Level 2 (NORMAL)'. When the first communication state of the first communication circuit is the urgent state and the second communication state of the second communication circuit is the off state, the communication state of the first band for transmission (e.g., Service 1) of the at least a part of the data through the first communication circuit may be identified as 'Level 3 (URGENT)'. As such, the communication state of the first band may be identified based on a combination of the first communication state of the first communication circuit and the second communication state of the second communication circuit.

In operation 1220, the processor may determine at least one of a retransmission count, a transmission power level, a packet type, or a retransmission time period of the at least a part of the data, based on the identified communication state of the first band. For example, the processor may determine at least one of a retransmission count, a transmission power level, a packet type, or a retransmission time period of the at least a part of the data, based on the communication state of the first band.

According to an embodiment of the disclosure, the processor may designate a value corresponding to a retransmission count, a transmission power level, a packet type, or a retransmission time period, based on the level of the communication state of the first band. For the designated value (e.g., a retransmission count $W_{esco}$), Table 2 will be referred to. The processor may determine a value corresponding to the communication state (e.g., the level) of the first band as a configuration value related to retransmission of the at least a part of the data, based on the value designated according to the level of the communication state of the first band.

Figure 13:
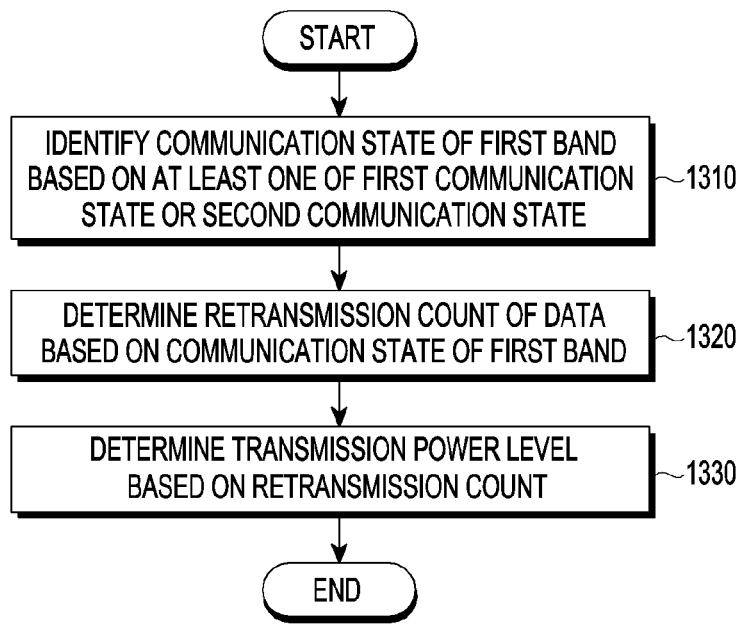
FIG. 13 is a flowchart illustrating a method for transmitting Bluetooth-based data in an electronic device according to various embodiments of the disclosure.

FIG. 13 is a flowchart illustrating a method for transmitting Bluetooth-based data in an electronic device according to various embodiments of the disclosure. FIG. 13 is a detailed flowchart illustrating an operation of determining a configuration value related to retransmission of data in operation 1110 shown in FIG. 11, in which the method may be performed by at least one of an electronic device (e.g., the electronic device 501) or a processor (e.g., the processor 550) of the electronic device.

In operation 1310, the processor may identify the communication state of the first band, based on at least one of the first communication state of the first communication circuit (e.g., the first communication circuit 510) using the first band or the second communication state of the second communication circuit (e.g., the second communication circuit 520) using the first band. Operation 1310 is the same as operation 1210 of FIG. 12, and thus a description thereof will be replaced with the foregoing description of operation 1210.

In operation 1320, the processor may determine a retransmission count of the at least a part of the data, based on the identified communication state of the first band.

According to an embodiment of the disclosure, the processor may designate a value corresponding to a retransmission count, based on the level of the communication state of the first band. For the designated value (e.g., a retransmission count $W_{esco}$), Table 2 will be referred to. The processor may determine a value corresponding to the communication state (e.g., the level) of the first band as the retransmission count of the at least a part of the data, based on the value designated according to the level of the communication state of the first band. For example, referring to Table 2, the processor may determine the retransmission count as 10 $W_{esco}$ (e.g., 5 times) when the identified communication state of the first band is Level 1 (IDLE). The processor may determine the retransmission count as 6 $W_{esco}$ (e.g., 3 times) or 10 $W_{esco}$ (e.g., 5 times) when the identified communication state of the first band is Level 2 (NORMAL). The processor may determine the retransmission count as 4 $W_{esco}$ (e.g., 2 times) when the identified communication state of the first band is Level 3 (URGENT).

In operation 1330, based on a reference transmission power level designated for each transmission count, the processor may determine the reference transmission power level corresponding to the determined retransmission count as a transmission power level in retransmission of at least a part of the data.

According to an embodiment of the disclosure, the processor may designate a reference transmission power level for each retransmission count. For example, the processor may designate a reference transmission power level as about 10 dB when a retransmission count is once or twice, as about 13 dB for a retransmission count of 3 or 4 times, and as about 15 dB for a retransmission count of 5 or 6 times (see FIG. 7).

Figure 14:
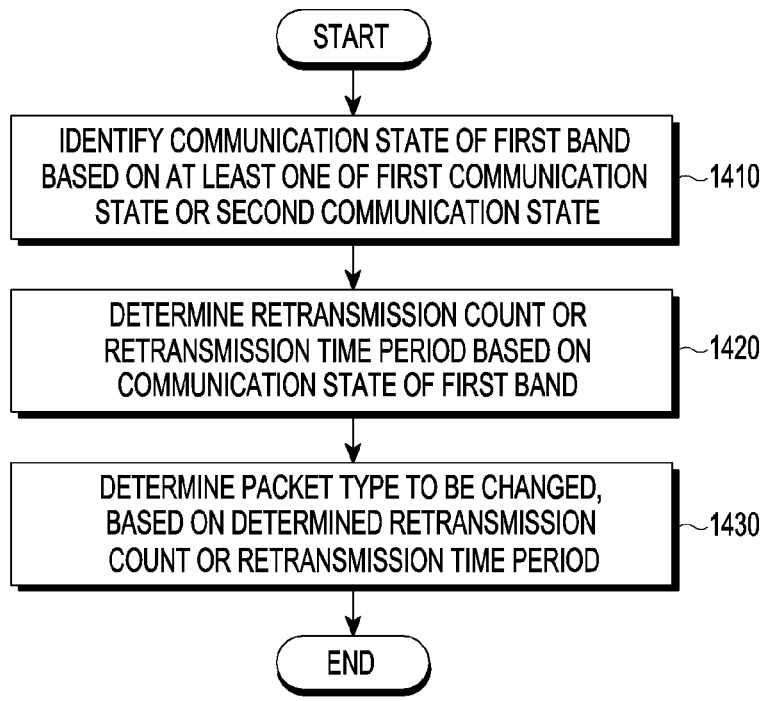
FIG. 14 is a flowchart illustrating a method for transmitting Bluetooth-based data in an electronic device according to various embodiments of the disclosure.

FIG. 14 is a flowchart illustrating a method for transmitting Bluetooth-based data in an electronic device according to various embodiments of the disclosure. FIG. 14 is a detailed flowchart illustrating an operation of determining a configuration value related to retransmission of data in operation 1110 shown in FIG. 11, in which the method may be performed by at least one of an electronic device (e.g., the electronic device 501) or a processor (e.g., the processor 550) of the electronic device.

In operation 1410, the processor may identify the communication state of the first band, based on at least one of the first communication state of the first communication circuit (e.g., the first communication circuit 510) using the first band or the second communication state of the second communication circuit (e.g., the second communication circuit 520) using the first band. Operation 1410 is the same as operation 1210 of FIG. 12, and thus a description thereof will be replaced with the foregoing description of operation 1210.

In operation 1420, the processor may determine a retransmission count or a retransmission time period of the at least a part of the data, based on the identified communication state of the first band.

According to an embodiment of the disclosure, the processor may designate a value corresponding to a retransmission count, based on the level of the communication state of the first band. For the previously designated value (e.g., a retransmission count $W_{esco}$), Table 2 will be referred to. The processor may determine a value corresponding to the communication state (e.g., the level) of the first band as the retransmission count of the at least a part of the data, based on the value designated according to the level of the communication state of the first band.

According to an embodiment of the disclosure, the processor may preset a value corresponding to a retransmission time period, based on the level of the communication state of the first band. The processor may determine a value corresponding to the communication state (e.g., the level) of the first band as the retransmission time period of the at least a part of the data, based on the value corresponding to the designated retransmission time period, according to the level of the communication state of the first band.

In operation 1430, the processor may change a packet type of the at least a part of the data in retransmission of the at least a part of the data, based on the determined retransmission count or the determined retransmission time period.

According to an embodiment of the disclosure, the processor may determine a packet type having a lower-quality modulation scheme or a lower transmission speed as a packet type into which the packet type of the at least a part of the data is to be changed in retransmission of the at least a part of the data, when the determined retransmission count is exceeded or the processor fails to receive a response to the retransmission from the external electronic device (e.g., the electronic device 102 or 104) in the determined retransmission period. For example, in retransmission of the at least a part of the data using a packet type of 2-EV3 having a transmission speed of about 2 Mbps (see Table 3), when the determined retransmission count is exceeded or the processor 550 fails to receive a response to the retransmission from the external electronic device in the determined retransmission period, the processor may determine a packet type having a lower-quality modulation scheme or a lower transmission speed than the packet type of 2-EV3 (e.g., EV3 having a transmission speed of about 1 Mbps, see Table 3) as a packet type into which the packet type of the at least a part of the data is to be changed in retransmission of the at least a part of the data.

Figure 15:
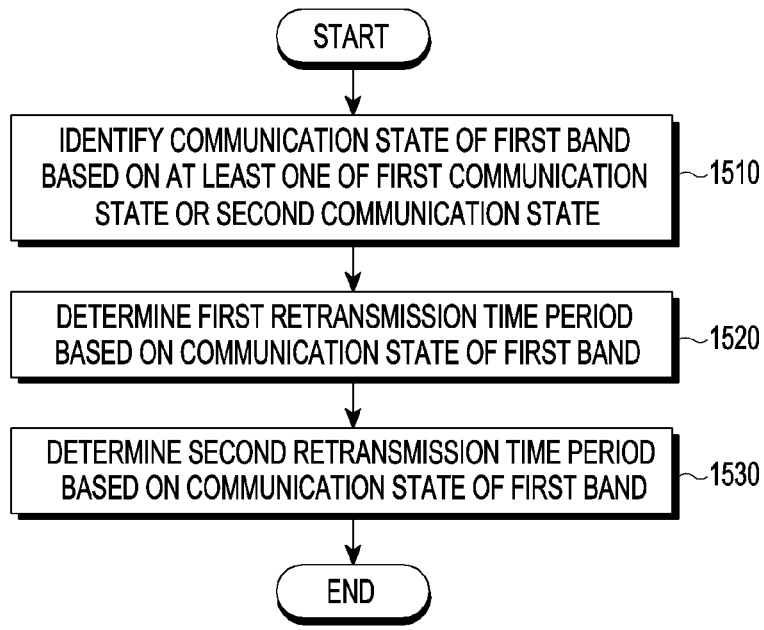
FIG. 15 is a flowchart illustrating a method for transmitting Bluetooth-based data in an electronic device according to various embodiments of the disclosure.

FIG. 15 is a flowchart illustrating a method for transmitting Bluetooth-based data in an electronic device according to various embodiments of the disclosure. FIG. 15 is a detailed flowchart illustrating an operation of determining a configuration value related to retransmission of data in operation 1110 shown in FIG. 11, in which the method may be performed by at least one of an electronic device (e.g., the electronic device 501) or a processor (e.g., the processor 550) of the electronic device.

In operation 1510, the processor may identify the communication state of the first band, based on at least one of the first communication state of the first communication circuit (e.g., the first communication circuit 510) using the first band or the second communication state of the second communication circuit (e.g., the second communication circuit 520) using the first band. Operation 1510 is the same as operation 1210 of FIG. 12, and thus a description thereof will be replaced with the foregoing description of operation 1210.

In operation 1520, the processor may determine a first retransmission time period in which the at least a part of the data is retransmitted at the first transmission power level, based on the identified communication state of the first band.

According to an embodiment of the disclosure, the first retransmission time period may be a time period that is set to monitor whether the at least a part of the data is retransmitted, such that a time for retransmission is determined by raising a transmission power level in retransmission of the at least a part of the data. For example, the processor may retransmit the at least a part of the data at the first transmission power level in the determined first retransmission time period. The processor may retransmit the at least a part of the data by raising the transmission power level when retransmission of the at least a part of the data fails in the determined first retransmission time period, as a result of monitoring retransmission of the at least a part of the data in the determined first retransmission time period.

According to an embodiment of the disclosure, the first retransmission time period may be set shorter than a maximum transmission interval for transmitting the at least a part of the data without interruption of a sound based on a type of the data. For example, when the type of the data is SCO or eSCO, the maximum transmission interval may be about 7.5 through 20 msec, and when the type of the data is ACL, the maximum transmission interval may be about 20 to 40 msec.

In operation 1530, the processor may determine the second retransmission time period in which the at least a part of the data is retransmitted at the second transmission power level, based on the identified communication state of the first band.

According to an embodiment of the disclosure, the second retransmission time period may be a time period for retransmitting the at least a part of the data by raising the transmission power level when failing to receive a response to retransmission from an external electronic device in the first retransmission time period. For example, when failing to receive a response to transmission of the at least a part of the data through the first communication circuit from the external electronic device in the first retransmission time period, the processor may retransmit the at least a part of the data at the second transmission power level in the second retransmission time period.

According to an embodiment of the disclosure, the second retransmission time period may be set shorter than a maximum transmission interval for transmitting the at least a part of the data without interruption of a sound based on a type of the data. For example, when the type of the data is SCO or eSCO, the maximum transmission interval may be about 7.5 through 20 msec, and when the type of the data is ACL, the maximum transmission interval may be about 20 to 40 msec.

According to an embodiment of the disclosure, the processor may set a sum of the first retransmission time period and the second retransmission time period to be shorter than a maximum transmission interval for transmitting the at least a part of the data without interruption of a sound based on a type of the data. For example, when the type of the data is SCO or eSCO, the maximum transmission interval may be about 7.5 through 20 msec, and when the type of the data is ACL, the maximum transmission interval may be about 20 to 40 msec.

Figure 16:
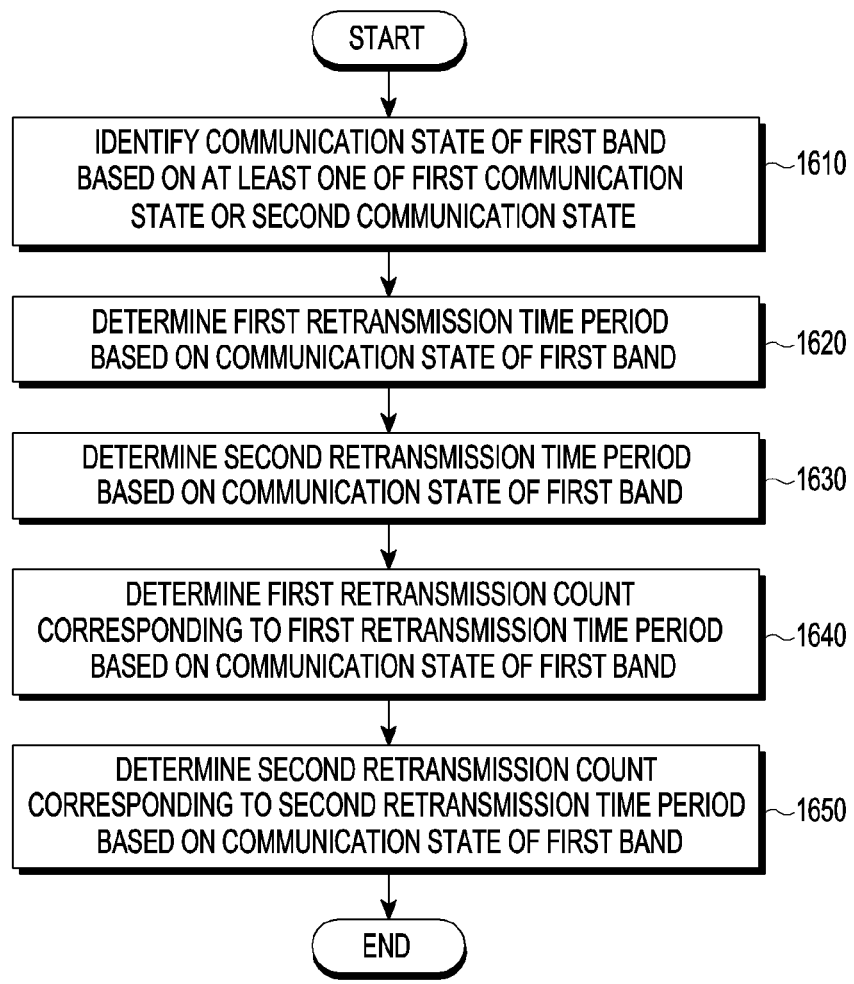
FIG. 16 is a flowchart illustrating a method for transmitting Bluetooth-based data in an electronic device according to various embodiments of the disclosure.

FIG. 16 is a flowchart illustrating a method for transmitting Bluetooth-based data in an electronic device according to various embodiments of the disclosure. FIG. 16 is a detailed flowchart illustrating an operation of determining a configuration value related to retransmission of data in operation 1110 shown in FIG. 11, in which the method may be performed by at least one of an electronic device (e.g., the electronic device 501) or a processor (e.g., the processor 550) of the electronic device.

In operation 1610, the processor may identify the communication state of the first band, based on at least one of the first communication state of the first communication circuit (e.g., the first communication circuit 510) using the first band or the second communication state of the second communication circuit (e.g., the second communication circuit 520) using the first band. Operation 1610 is the same as operation 1210 of FIG. 12, and thus a description thereof will be replaced with the foregoing description of operation 1210.

In operation 1620, the processor may determine a first retransmission time period in which the at least a part of the data is retransmitted at the first transmission power level, based on the identified communication state of the first band. Operation 1620 is the same as operation 1520 of FIG. 15, and thus a description thereof will be replaced with the foregoing description of operation 1210.

In operation 1630, the processor may determine the second retransmission time period in which the at least a part of the data is retransmitted at the second transmission power level, based on the identified communication state of the first band. Operation 1630 is the same as operation 1530 of FIG. 15, and thus a description thereof will be replaced with the foregoing description of operation 1210.

In operation 1640, the processor may determine the first retransmission count corresponding to the first retransmission time period, based on the identified communication state of the first band.

According to an embodiment of the disclosure, the first retransmission count may be set to limit a retransmission count in the first retransmission time period such that when retransmission of the at least a part of the data fails in the first retransmission time period, the at least a part of the data is retransmitted by raising a transmission power level. According to an embodiment of the disclosure, the first retransmission count may be previously set by a user or may be previously designated by the electronic device. According to an embodiment of the disclosure, the first retransmission count may be set based on a retransmission count determined based on the communication state of the first band. According to an embodiment of the disclosure, the first retransmission count may be determined based on the communication state of the first band. For example, the electronic device 501 may determine at least a part of the retransmission count determined based on the communication state of the first band as the first retransmission count and another part of the determined retransmission count as the second retransmission count.

According to an embodiment of the disclosure, when a retransmission count of the at least a part of the data exceeds the first retransmission count in the determined first retransmission time period, the processor may retransmit the at least a part of the data at the second transmission power level in the second retransmission time period.

In operation 1650, the processor may determine the second retransmission count corresponding to the second retransmission time period, based on the identified communication state of the first band.

According to an embodiment of the disclosure, the second retransmission count may be set to limit a retransmission count in the second retransmission time period such that when retransmission of the at least a part of the data fails in the second retransmission time period, the at least a part of the data is retransmitted by lowering a transmission power level. According to an embodiment of the disclosure, the second retransmission count may be previously set by a user or may be previously designated by the electronic device. According to an embodiment of the disclosure, the second retransmission count may be set based on a retransmission count determined based on the communication state of the first band. According to an embodiment of the disclosure, the second retransmission count may be determined based on the communication state of the first band. For example, the processor may determine at least a part of the retransmission count determined based on the communication state of the first band as the first retransmission count, and another part of the determined retransmission count as the second retransmission count.

According to an embodiment of the disclosure, when a retransmission count of the at least a part of the data exceeds the second retransmission count in the determined second retransmission time period, the processor may retransmit the at least a part of the data at the first transmission power level. When retransmission of the at least a part of the data in the second retransmission time period fails, the processor may determine that retransmission of the at least a part of the data is not possible and lower the transmission power level to prevent unnecessary power consumption.

According to an embodiment of the present disclosure, operations (1620 and 1630) of determining the first retransmission time period and the second retransmission time period and operations (1640 and 1650) of determining the first retransmission count and the second retransmission count are not limited to an order shown in FIG. 16, and operations 1640 and 1650 may be performed first, and then operations 1620 and 1630 may be performed later.

According to various embodiments of the disclosure, a method for transmitting Bluetooth-based data in an electronic device (e.g., the electronic device 501) may include detecting a communication state of at least one of a first communication circuit (e.g., the first communication circuit 510) using a first band or a second communication circuit (e.g., the second communication circuit 520) using the first band and controlling retransmission of at least a part of data transmitted to an external electronic device (e.g., the electronic device 102 or 104) through the first communication circuit, based on the detected communication state.

According to various embodiments of the disclosure, the controlling of the retransmission of the at least a part of the data may include determining a configuration value related to the retransmission based on the detected communication state, transmitting the at least a part of the data through the first communication circuit, and retransmitting the at least a part of the data according to the determined configuration value when failing to receive a response to transmission of the at least a part of the data from the external electronic device through the first communication circuit.

According to various embodiments of the disclosure, the configuration value may include at least one of a retransmission count, a transmission power level, a packet type, or a retransmission time period.

According to various embodiments of the disclosure, the determining of the configuration value may include identifying the communication state of the first band based on at least one of the first communication state of the first communication circuit, which is detected based on the first information related to the first service being executed through the first communication circuit, or the second communication state of the second communication circuit, which is detected based on the second information related to the second service being executed through the second communication circuit, and determining at least one of the retransmission count, the transmission power level, the packet type, or the retransmission time period, based on the identified communication state of the first band.

According to various embodiments of the disclosure, the determining of the configuration value may include identifying the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, determining a retransmission count of the at least a part of the data based on the identified communication state of the first band, and determining a reference transmission power level corresponding to the determined retransmission count as a transmission power level for retransmission of the at least a part of the data based on a reference transmission power level designated for each retransmission count.

According to various embodiments of the disclosure, the determining of the configuration value may include identifying the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, determining a retransmission count or a retransmission time period of the at least a part of the data based on the identified communication state of the first band, and changing a packet type of the at least a part of the data in retransmission of the at least a part of the data based on the determined retransmission count or the determined retransmission time period.

According to various embodiments of the disclosure, the determining of the configuration value may include identifying the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, determining the first retransmission time period in which the at least a part of the data is retransmitted at the first transmission power level based on the identified communication state of the first band, and determining the second retransmission time period in which the at least a part of the data is retransmitted at the second transmission power level higher than the first transmission power level based on the identified communication state of the first band.

According to various embodiments of the disclosure, the retransmitting of the at least a part of the data may include retransmitting the at least a part of the data at the first transmission power level in the determined first retransmission time period and retransmitting the at least a part of the data at the second transmission power level in the second retransmission time period when failing to receive a response to retransmission of the at least a part of the data from the external electronic device through the first communication circuit in the first retransmission time period.

According to various embodiments of the disclosure, the determining of the configuration value may include identifying the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, determining the first retransmission time period in which the at least a part of the data is retransmitted at the first transmission power level, determining the second retransmission time period in which the at least a part of the data is retransmitted at the second transmission power level higher than the first transmission power level based on the identified communication state of the first band, and determining the first retransmission count corresponding to the first retransmission time period and the second retransmission count of the at least a part of the data, which corresponds to the second retransmission time period based on the identified communication state of the first band.

According to various embodiments of the disclosure, the retransmitting of the at least a part of the data may include retransmitting the at least a part of the data at the second transmission power level in the second retransmission time period when the retransmission count of the at least a part of the data in the determined first retransmission time period exceeds the first retransmission count and retransmitting the at least a part of the data at the first transmission power level when the retransmission count of the at least a part of the data in the determined second retransmission time period exceeds the second retransmission count.

At least a part of an apparatus (e.g., modules or functions thereof) or a method (e.g., operations) according to various embodiments may be implemented with instructions stored in a computer-readable storage medium in the form of a programming circuit. When the instructions are executed by one or more processors (for example, the processor 120), the one or more processors may perform functions corresponding to the instructions. The computer-readable storage medium may be, for example, a memory included in the memory 130.

The computer readable recording medium may include a hard disk, a floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

According to various embodiments of the disclosure, a computer-readable recording medium has recorded thereon a program to be executed on a computer, the program including instructions that cause, when executed by a processor (e.g., a processor 550) of an electronic device (e.g., the electronic device 501), the processor to detect a communication state of at least one of a first communication circuit (e.g., the first communication circuit 510) using a first band or a second communication circuit (e.g., the second communication circuit 520) using the first band and to control retransmission of at least a part of data transmitted to an external electronic device (e.g., the electronic device 102 or 104) through the first communication, circuit based on the detected communication state.

According to various embodiments of the disclosure, the program may include an executable command for causing the processor to determine a configuration value related to the retransmission based on the detected communication state, to transmit the at least a part of the data through the first communication circuit, and to retransmit the at least a part of the data according to the determined configuration value when failing to receive a response to transmission of the at least a part of the data from the external electronic device through the first communication circuit.

According to various embodiments of the disclosure, the program may include an executable command for causing the processor to identify the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, and to determine at least one of the retransmission count, the transmission power level, the retransmission time period, or the packet type, based on the identified communication state of the first band.

According to various embodiments of the disclosure, the program may include an executable command for causing the processor to identify the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, to determine a retransmission count of the at least a part of the data based on the identified communication state of the first band, and to determine a reference transmission power level corresponding to the determined retransmission count as a transmission power level for retransmission of the at least a part of the data based on a reference transmission power level designated for each retransmission count.

According to various embodiments of the disclosure, the program may include an executable command for causing the processor to identify the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, to determine a retransmission count or a retransmission time period of the at least a part of the data based on the identified communication state of the first band, and to change a packet type of the at least a part of the data in retransmission of the at least a part of the data based on the determined retransmission count or the determined retransmission time period.

According to various embodiments of the disclosure, the program may include an executable command for causing the processor to identify the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, to determine the first retransmission time period in which the at least a part of the data is retransmitted at the first transmission power level based on the identified communication state of the first band, and to determine the second retransmission time period in which the at least a part of the data is retransmitted at the second transmission power level higher than the first transmission power level based on the identified communication state of the first band.

According to various embodiments of the disclosure, the program may include an executable command for causing the processor to retransmit the at least a part of the data at the first transmission power level in the determined first retransmission time period and to retransmit the at least a part of the data at the second transmission power level in the second retransmission time period when failing to receive a response to retransmission of the at least a part of the data from the external electronic device through the first communication circuit in the first retransmission time period.

According to various embodiments of the disclosure, the program may include an executable command for causing the processor to identify the communication state of the first band, based on at least one of the first communication state of the first communication circuit, which is detected based on the first information related to the first service being executed through the first communication circuit, or the second communication state of the second communication circuit, which is detected based on the second information related to the second service being executed through the second communication circuit, to determine the first retransmission time period in which the at least a part of the data is retransmitted at the first transmission power level, to determine the second retransmission time period in which the at least a part of the data is retransmitted at the second transmission power level higher than the first transmission power level based on the identified communication state of the first band, and to determine the first retransmission count corresponding to the first retransmission time period and the second retransmission count of the at least a part of the data, which corresponds to the second retransmission time period based on the identified communication state of the first band.

According to various embodiments of the disclosure, the program may include an executable command for causing the processor to retransmit the at least a part of the data at the second transmission power level in the second retransmission time period when the retransmission count of the at least a part of the data in the determined first retransmission time period exceeds the first retransmission count and to retransmit the at least a part of the data at the first transmission power level when the retransmission count of the at least a part of the data in the determined second retransmission time period exceeds the second retransmission count.

The embodiments disclosed herein have been provided for description and understanding of disclosed technical matters and are not intended to limit the scope of the present disclosure. Therefore, it should be construed that the scope of the present disclosure includes any change or other various embodiments based on the technical spirit of the present disclosure.

The invention claimed is:

1. An electronic device comprising:
a housing;
a first communication circuit which is located in the housing and uses a first band;
a second communication circuit which is located in the housing and uses the first band;
at least one processor which is located in the housing and electrically connected to the first communication circuit and the second communication circuit; and
a memory which is located in the housing and electrically connected to the processor,
wherein the memory stores instructions that cause, when executed, the processor to:
detect a communication state of at least one of the first communication circuit or the second communication circuit;
control retransmission of at least a part of data transmitted to an external electronic device through the first communication circuit, based on the detected communication state;
based on identifying a retransmission count of the at least a part of the data being greater than a first predetermined value, increase a transmission power level for the at least a part of the data from a first transmission power level to a second transmission power level; and
based on identifying the retransmission count of the at least a part of the data being greater than a second predetermined value which is greater than the first predetermined value, decrease the transmission power level for the at least a part of the data from the second transmission power level to the first transmission power level.

2. The electronic device of claim 1, wherein the first communication circuit performs Bluetooth communication, and the second communication circuit performs Wireless Fidelity (Wi-Fi) communication.

3. The electronic device of claim 1, wherein the data comprises audio data.

4. The electronic device of claim 1, wherein the instructions comprise instructions that cause the processor to determine a configuration value related to the retransmission based on the detected communication state, to transmit the at least a part of the data to the external electronic device through the first communication circuit, and to retransmit the at least a part of the data based on the determined configuration value when failing to receive a response to transmission of the at least a part of the data from the external electronic device through the first communication circuit.

5. The electronic device of claim 4, wherein the configuration value comprises at least one of the retransmission count, the transmission power level, a packet type, or a retransmission time period.

6. The electronic device of claim 5, wherein the instructions comprise instructions that cause the processor to:
identify a communication state of the first band, based on at least one of a first communication state of the first communication circuit, which is detected based on first information related to a first service being executed through the first communication circuit, or a second communication state of the second communication circuit, which is detected based on second information related to a second service being executed through the second communication circuit; and
determine at least one of the retransmission count, the transmission power level, the packet type, or the retransmission time period of the at least a part of the data, based on the identified communication state of the first band.

7. The electronic device of claim 6, wherein the first information comprises at least some of first service information, first resource information, first traffic information, first data loss information, or first buffer state information, and
the second information comprises at least some of second service information, second resource information, second traffic information, second data loss information, or second buffer state information.

8. The electronic device of claim 4, wherein the data comprises at least one packet, each of which is transmitted or retransmitted using at least one slot, and the configuration value is determined for each packet corresponding to the at least a part of the data.

9. The electronic device of claim 4, wherein the instructions comprise instructions that cause the processor to:
identify a communication state of the first band, based on at least one of a first communication state of the first communication circuit, which is detected based on first information related to a first service being executed through the first communication circuit, or a second communication state of the second communication circuit, which is detected based on second information related to a second service being executed through the second communication circuit;
determine the retransmission count of the at least a part of the data, based on the identified communication state of the first band; and
determine a reference transmission power level corresponding to the determined retransmission count as the transmission power level in the retransmission of the at least a part of the data, based on a reference transmission power level designated for each transmission count.

10. The electronic device of claim 4, wherein the instructions comprise instructions that cause the processor to:
identify a communication state of the first band, based on at least one of a first communication state of the first communication circuit, which is detected based on first information related to a first service being executed through the first communication circuit, or a second communication state of the second communication circuit, which is detected based on second information related to a second service being executed through the second communication circuit;
determine the retransmission count or a retransmission time period of the at least a part of the data, based on the identified communication state of the first band; and
change a packet type of the at least a part of the data in the retransmission of the at least a part of the data, based on the determined retransmission count or the determined retransmission time period.

11. The electronic device of claim 1, wherein the instructions comprise instructions that cause the processor to stop transmitting or retransmitting the at least a part of the data when receiving reception-impossible state information of the data based on the external electronic device from the external electronic device.

12. A method for transmitting Bluetooth-based data in an electronic device, the method comprising:
  detecting a communication state of at least one of a first communication circuit using a first band or a second communication circuit using the first band;
  controlling retransmission of at least a part of data transmitted to an external electronic device through the first communication circuit, based on the detected communication state;
  based on identifying a retransmission count of the at least a part of the data being greater than a first predetermined value, increasing a transmission power level for the at least a part of the data from a first transmission power level to a second transmission power level; and
  based on identifying the retransmission count of the at least a part of the data being greater than a second predetermined value which is greater than the first predetermined value, decreasing the transmission power level for the at least a part of the data from the second transmission power level to the first transmission power level.

13. The method of claim 12, wherein the controlling of the retransmission of the at least a part of the data comprises:
  determining a configuration value related to the retransmission based on the detected communication state;
  transmitting the at least a part of the data to the external electronic device through the first communication circuit; and
  retransmitting the at least a part of the data based on the determined configuration value, when failing to receive a response to transmission of the at least a part of the data through the first communication circuit from the external electronic device.

14. The method of claim 13, wherein the determining of the configuration value comprises:
  identifying a communication state of the first band, based on at least one of a first communication state of the first communication circuit, which is detected based on first information related to a first service being executed through the first communication circuit, or a second communication state of the second communication circuit, which is detected based on second information related to a second service being executed through the second communication circuit;
  determining a first retransmission time period in which the at least a part of the data is retransmitted, based on the identified communication state of the first band; and
  determining a second retransmission time period in which the at least a part of the data is retransmitted, based on the identified communication state of the first band.

* * * * *